US011796332B2

(12) United States Patent
Slutskyy et al.

(10) Patent No.: US 11,796,332 B2
(45) Date of Patent: Oct. 24, 2023

(54) GENERATION OF OPTIMAL TRAJECTORIES FOR NAVIGATION OF VEHICLES

(71) Applicant: Motional AD LLC, Boston, MA (US)

(72) Inventors: Kostyantyn Slutskyy, Singapore (SG); Dmytro S. Yershov, Cambridge, MA (US)

(73) Assignee: Motional AD LLC, Boston, MA (US)

(*) Notice: Subject to any disclaimer, the term of this patent is extended or adjusted under 35 U.S.C. 154(b) by 116 days.

(21) Appl. No.: 16/655,411

(22) Filed: Oct. 17, 2019

(65) Prior Publication Data

US 2020/0132488 A1 Apr. 30, 2020

Related U.S. Application Data

(60) Provisional application No. 62/802,676, filed on Feb. 7, 2019, provisional application No. 62/752,786, filed on Oct. 30, 2018.

(51) Int. Cl.
*G01C 21/34* (2006.01)
*G05B 13/02* (2006.01)

(52) U.S. Cl.
CPC ..... *G01C 21/3492* (2013.01); *G01C 21/3446* (2013.01); *G05B 13/021* (2013.01)

(58) Field of Classification Search
CPC . G05D 1/0214; G05D 1/0212; B60W 30/095; B60W 30/0956; B60W 30/0953;
(Continued)

(56) References Cited

U.S. PATENT DOCUMENTS 10,671,076 B1* 6/2020 Kobilarov ............ G05D 1/0255
2010/0204866 A1 8/2010 Moshchuk et al.
(Continued)

FOREIGN PATENT DOCUMENTS

CA 2859552 2/2015
CN 101898559 12/2010
(Continued)

OTHER PUBLICATIONS

DK 3rd Technical Examination in Danish Appln. No. PA201970121, dated Jun. 12, 2020, 3 pages.
(Continued)

*Primary Examiner* — Ryan Rink
(74) *Attorney, Agent, or Firm* — Fish & Richardson P.C.

(57) ABSTRACT

Techniques for generation of an optimal trajectory for a vehicle include receiving, using one or more processors of the vehicle, an instruction for the vehicle to travel from an initial spatiotemporal location to a destination spatiotemporal location. One or more processors are used to generate a trajectory including travel segments. The trajectory begins at the initial spatiotemporal location and terminates at the destination spatiotemporal location. Each travel segment begins at a first spatiotemporal location and terminates at a second spatiotemporal location. Each travel segment is associated with operational metrics. The operational metrics are associated with navigating the vehicle from the first spatiotemporal location to the second spatiotemporal location. Each operational metric is optimized across the travel segments to generate the trajectory. Using a control module of the vehicle, the vehicle is navigated from the initial spatiotemporal location to the destination spatiotemporal location along the trajectory.

20 Claims, 19 Drawing Sheets

(58) Field of Classification Search
CPC .. B60W 30/08; G01C 21/343; G01C 21/3453
See application file for complete search history.

(56) References Cited

U.S. PATENT DOCUMENTS

| | | | | |
|---|---|---|---|---|
| 2014/0244151 | A1* | 8/2014 | Matsubara | B60W 30/095 701/301 |
| 2015/0248131 | A1* | 9/2015 | Fairfield | B60W 30/00 701/2 |
| 2015/0345971 | A1 | 12/2015 | Meuleau et al. | |
| 2016/0061617 | A1 | 3/2016 | Duggan et al. | |
| 2017/0158129 | A1 | 6/2017 | Cosatto | |
| 2017/0277193 | A1 | 9/2017 | Frazzoli et al. | |
| 2017/0356750 | A1 | 12/2017 | Iagnemma et al. | |
| 2018/0059687 | A1 | 3/2018 | Hayes et al. | |
| 2018/0188053 | A1 | 7/2018 | Fukuda et al. | |
| 2019/0026697 | A1 | 1/2019 | Burton et al. | |
| 2019/0389459 | A1* | 12/2019 | Berntorp | G08G 1/167 |
| 2020/0026722 | A1 | 1/2020 | Eade et al. | |
| 2020/0167426 | A1 | 5/2020 | Scheideler et al. | |
| 2020/0192368 | A1 | 6/2020 | Bonanni | |
| 2020/0377085 | A1* | 12/2020 | Floyd-Jones | B60W 60/00276 |
| 2021/0097739 | A1 | 4/2021 | Xie et al. | |

FOREIGN PATENT DOCUMENTS

| | | |
|---|---|---|
| CN | 102054362 | 5/2011 |
| CN | 104044593 | 9/2014 |
| CN | 108387228 | 8/2018 |
| EP | 2667275 | 11/2013 |
| WO | WO 2017139613 | 8/2017 |
| WO | WO 2018160724 | 9/2018 |

OTHER PUBLICATIONS

U.S. Appl. No. 16/697,272, filed Nov. 27, 2019, Bonanni.
[No Author Listed], "SAE International's Standard J3016: Taxonomy and Definitions for Terms Related to On-Road Motor Vehicle Automated Driving Systems," Sep. 2016, 30 pages.
DK 1rst Technical Examination in Danish Appln. No. PA201970121, dated May 27, 2019, 11 pages.
DK 2nd Technical Examination in Danish Appln. No. PA201970121, dated Nov. 14, 2019, 3 pages.
EP Search Report in European Appln. No. 19205798.2, dated Dec. 5, 2019, 7 pages.

* cited by examiner

```
1900
```

Generate, using one or more processors of a vehicle, a plurality of travel segments for navigating the vehicle, wherein the plurality of travel segments is associated with a plurality of operational metrics
1904

Rank, using the one or more processors, each operational metric of the plurality of operational metrics, such that a first operational metric of the plurality of operational metrics that is associated with navigational safety is ranked higher than a second operational metric of the plurality of operational metrics that is different from the first operational metric
1908

Select one or more travel segments of the plurality of travel segments for navigating the vehicle, such that each operational metric of the plurality of operational metrics associated with the selected one or more travel segments is optimized in accordance with a rank of the operational metric
1912

Navigate, using a control module of the vehicle, the vehicle in accordance with the selected one or more travel segments
1916

FIG. 19

GENERATION OF OPTIMAL TRAJECTORIES FOR NAVIGATION OF VEHICLES

CROSS-REFERENCE TO RELATED APPLICATIONS

This application claims the benefit of U.S. Provisional Application 62/752,786, filed on Oct. 30, 2018, and U.S. Provisional Application 62/802,676, filed on Feb. 7, 2019, both of which are incorporated herein by reference in their entirety

TECHNICAL FIELD

This description relates generally to operation of vehicles and specifically to generation of optimal trajectories for navigation of vehicles.

BACKGROUND

Navigation of a vehicle from an initial location to a final destination often requires a user or the vehicle's decision-making system to select a route through a road network from the initial location to the requested final destination. The road network may include multiple streets and/or lanes connecting different geographical locations. Such a road network is sometimes represented as a directed graph having edge weights corresponding to the cost of traversing each segment in the road network. However, such a directed graph can have millions of edges, making traditional algorithms for route selection impractical.

Traditional greedy algorithms are sometimes used to select a route across the directed graph from the initial location to the requested final destination. However, if a large number of other vehicles on the road use such a greedy algorithm, the selected route may become overloaded and travel may slow to a crawl. In addition, the presence of parked vehicles, construction zones, and pedestrians complicate route selection and navigation.

SUMMARY

Techniques are provided for generation of an optimal trajectory for a vehicle by optimizing the costs of maneuvering the vehicle along each of the travel segments of the optimal trajectory. The generating of the optimal trajectory includes receiving, using one or more processors of the vehicle, an instruction for the vehicle to travel from an initial spatiotemporal location to a destination spatiotemporal location. The one or more processors are used to generate a trajectory including a plurality of travel segments. The trajectory begins at the initial spatiotemporal location and terminates at the destination spatiotemporal location. Each travel segment of the plurality of travel segments begins at a first spatiotemporal location of a plurality of spatiotemporal locations and terminates at a second spatiotemporal location of the plurality of spatiotemporal locations. The plurality of spatiotemporal locations includes the initial spatiotemporal location and the destination spatiotemporal location. Each travel segment of the plurality of travel segments is associated with a plurality of operational metrics. The plurality of operational metrics is associated with navigating the vehicle from the first spatiotemporal location to the second spatiotemporal location. Each operational metric of the plurality of operational metrics is optimized across the plurality of travel segments to generate the trajectory. Using a control module of the vehicle, the vehicle is navigated from the initial spatiotemporal location to the destination spatiotemporal location along the trajectory.

Techniques are also provided for generating, using one or more processors of a vehicle, a plurality of travel segments for navigating the vehicle, wherein the plurality of travel segments is associated with a plurality of operational metrics. Using the one or more processors, each operational metric of the plurality of operational metrics is ranked, such that a first operational metric of the plurality of operational metrics that is associated with navigational safety is ranked higher than a second operational metric of the plurality of operational metrics that is different from the first operational metric. One or more travel segments of the plurality of travel segments is selected for navigating the vehicle, such that each operational metric of the plurality of operational metrics associated with the selected one or more travel segments is optimized in accordance with a rank of the operational metric. Using a control module of the vehicle, the vehicle is navigated in accordance with the selected one or more travel segments.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 19 illustrates a process for generating an optimal trajectory for navigation of an AV, in accordance with one or more embodiments.

DETAILED DESCRIPTION

Figure 1:
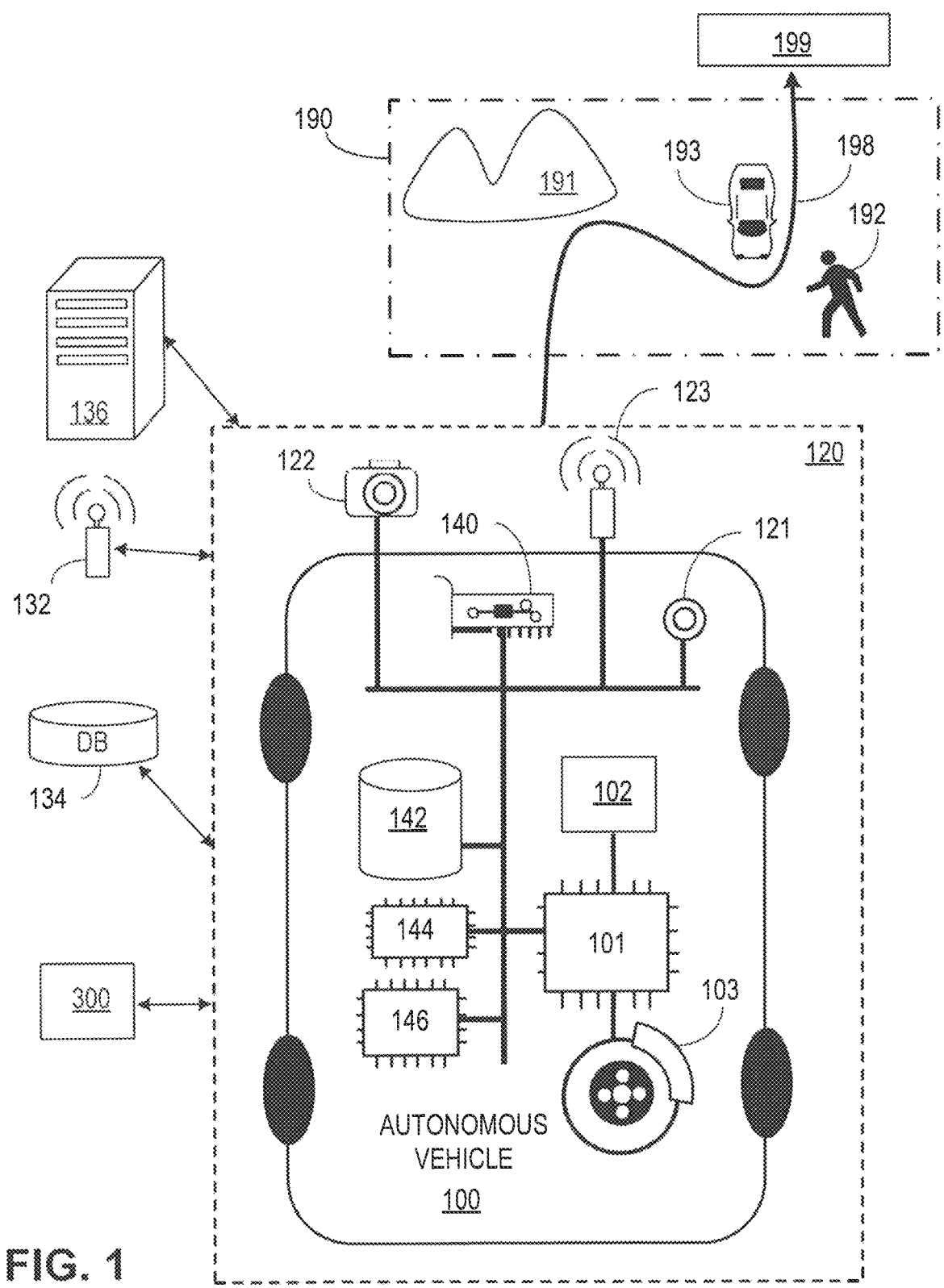
FIG. 1 illustrates an example of an autonomous vehicle (AV) having autonomous capability, in accordance with one or more embodiments.

In the following description, for the purposes of explanation, numerous specific details are set forth in order to provide a thorough understanding of the present embodiments. It will be apparent, however, that the present embodiments may be practiced without these specific details. In other instances, well-known structures and devices are shown in block diagram form in order to avoid unnecessarily obscuring the present embodiments.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
    2. System Overview
    3. Autonomous Vehicle Architecture
    4. Autonomous Vehicle Inputs
    5. Autonomous Vehicle Planning
    6. Autonomous Vehicle Control
    7. Architecture for Generating an Optimal Trajectory
    8. Method for Generating an Optimal Trajectory Across a Road Network
    9. Generating an Optimal Trajectory to Increase Lateral Clearance
    10. Generating an Optimal Trajectory to Reduce Stops
    11. Generating an Optimal Trajectory to Avoid Collisions
    12. Process for Generating an Optimal Trajectory General Overview Navigation of a vehicle requires determining a route for the vehicle to travel from an initial spatiotemporal location such as a passenger's house to a destination spatiotemporal location such as the passenger's workplace or a restaurant. The route begins at the initial spatiotemporal location and may traverse a large number of intermediate spatiotemporal locations of a road network or environment before terminating at the destination spatiotemporal location. The vehicle may receive an instruction, remotely from a server or from a passenger within the vehicle, to travel from the initial spatiotemporal location to the destination spatiotemporal location.

The embodiments disclosed herein sample the spatial driving environment (e.g., road network, parking lots, buildings, etc.) to derive a plurality of spatiotemporal locations, which are treated as vertices in a graph. A trajectory is generated from the initial spatiotemporal location to the destination spatiotemporal location by selecting travel segments from the present spatiotemporal location of the vehicle towards the destination spatiotemporal location. The trajectory generated is a concatenation of the travel segments. For each travel segment, a plurality of operational metrics (e.g., costs of navigating the travel segment) is determined. The determined operational metrics are used to generate an optimal trajectory.

In one embodiment, one or more processors of the vehicle are used to generate the trajectory for the vehicle including a plurality of travel segments. Each travel segment may be a section of a road or a change in heading (directional orientation) of the vehicle. The trajectory begins at the initial spatiotemporal location and terminates at the destination spatiotemporal location. Each travel segment of the plurality of travel segments begins at a first spatiotemporal location (e.g., a first intermediate location of the vehicle) of a plurality of spatiotemporal locations and terminates at a second spatiotemporal location (e.g., a second intermediate location) of the plurality of spatiotemporal locations. The plurality of spatiotemporal locations includes the initial spatiotemporal location and the destination spatiotemporal location.

Each travel segment of the plurality of travel segments is associated with a plurality of operational metrics. The plurality of operational metrics (e.g., a length of the travel segment, a number of stops along the travel segment, a number of predicted collisions on the travel segment, etc.) is associated with navigating the vehicle from the first spatiotemporal location to the second spatiotemporal location. Each operational metric of the plurality of operational metrics is optimized across the plurality of travel segments to generate the trajectory. Using a control module of the vehicle to drive the steering, throttle, and brakes, etc., the vehicle is navigated from the initial spatiotemporal location to the destination spatiotemporal location along the trajectory.

System Overview

FIG. 1 illustrates an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with reference to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are GNSS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
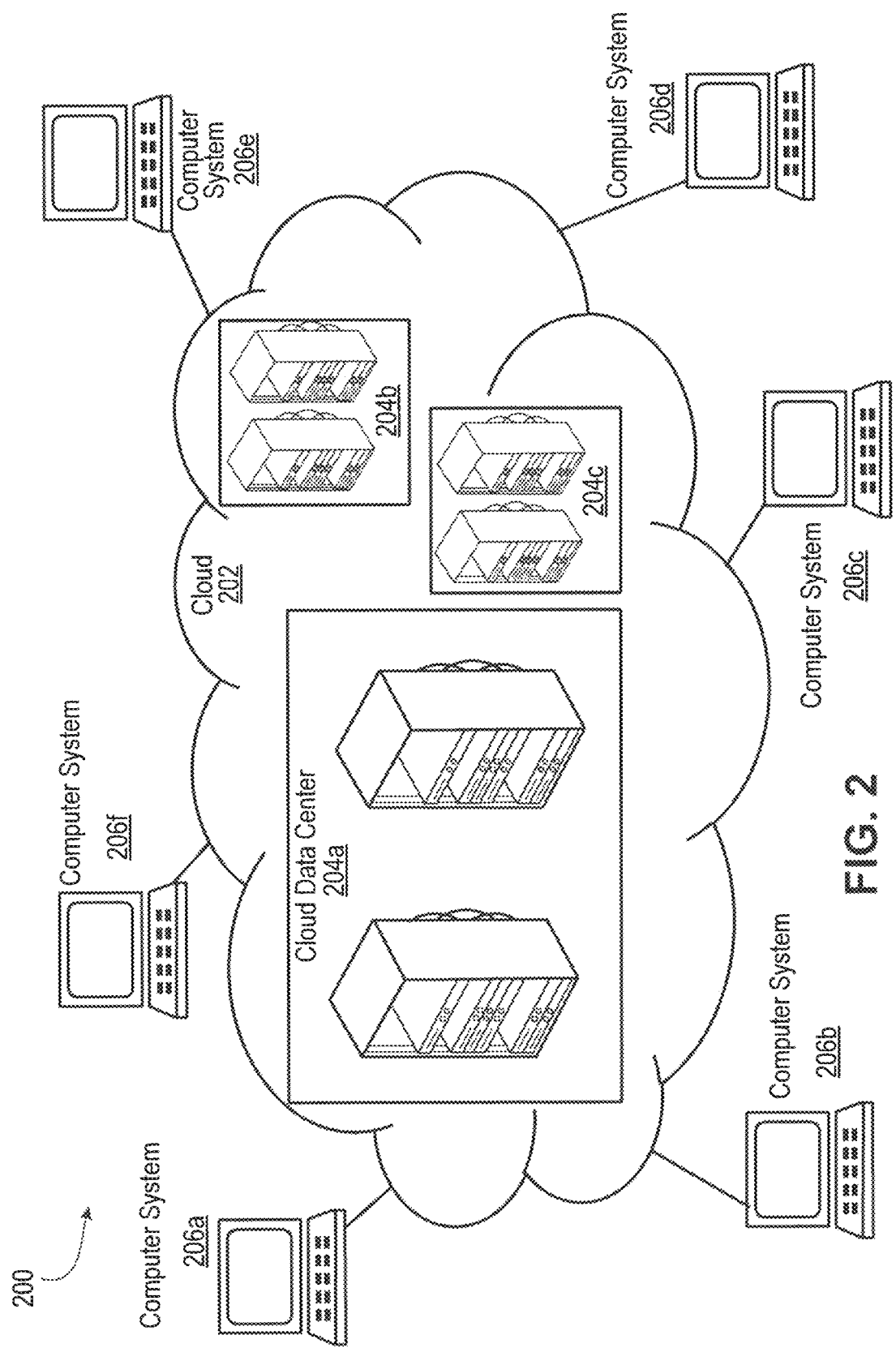
FIG. 2 illustrates an example "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
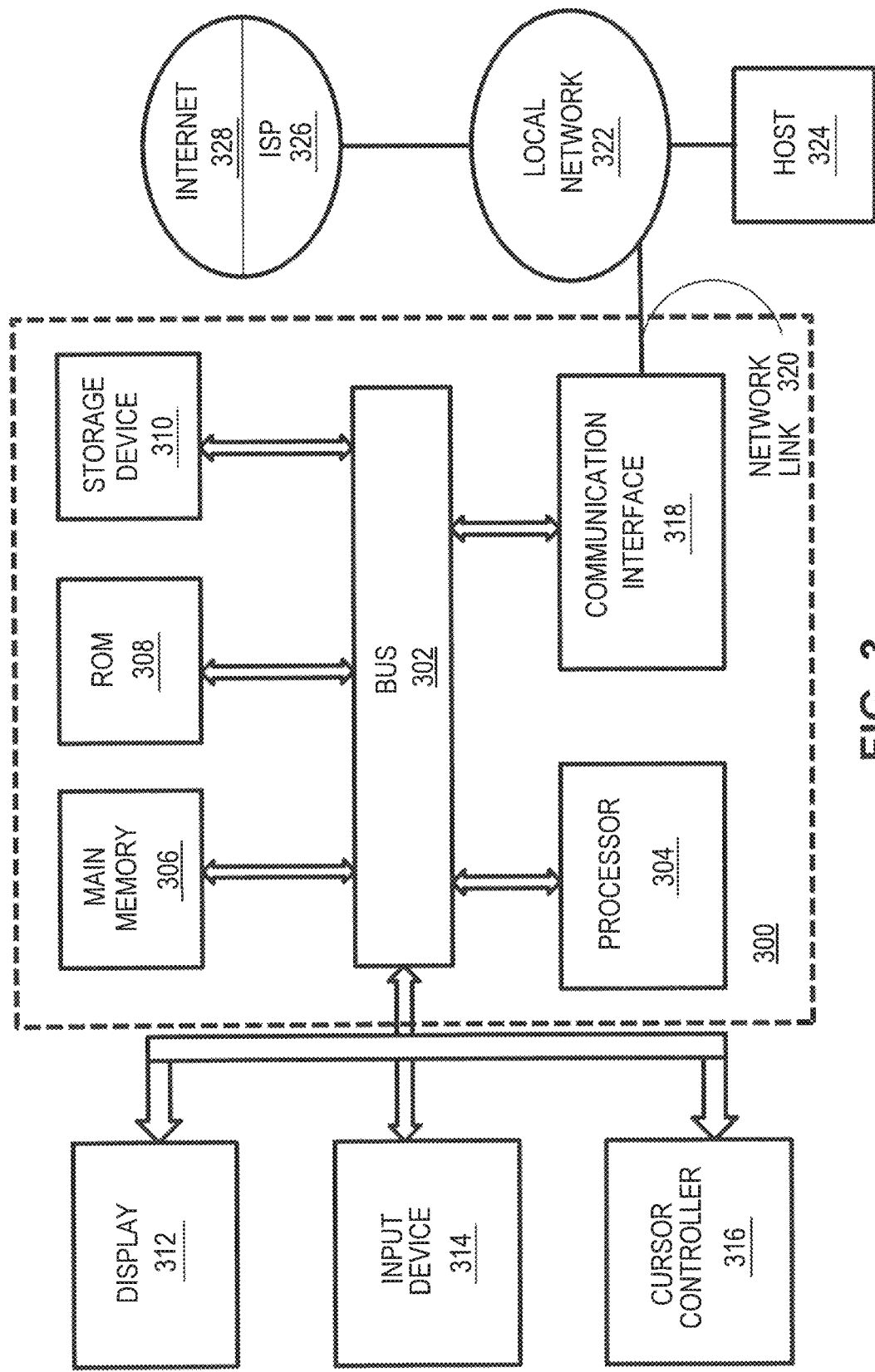
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
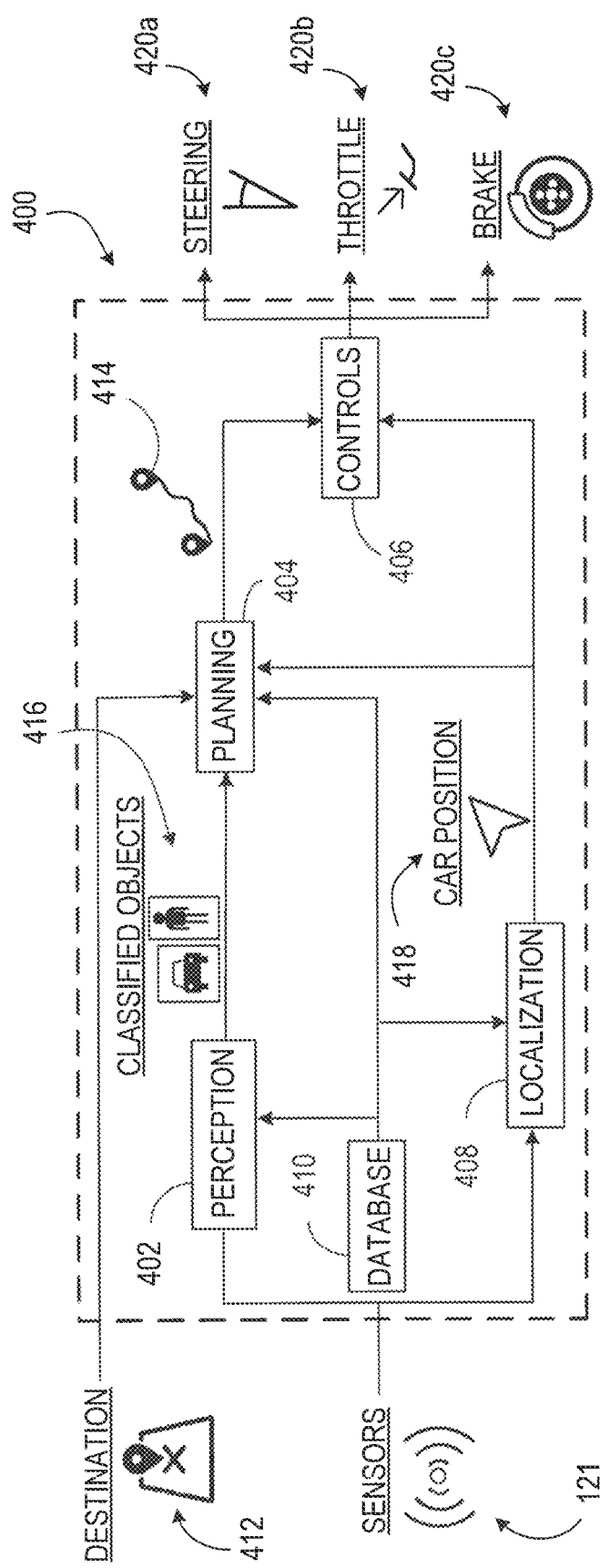
FIG. 4 illustrates an example architecture for an AV, in accordance with one or more embodiments.

FIG. 4 illustrates an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Operation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
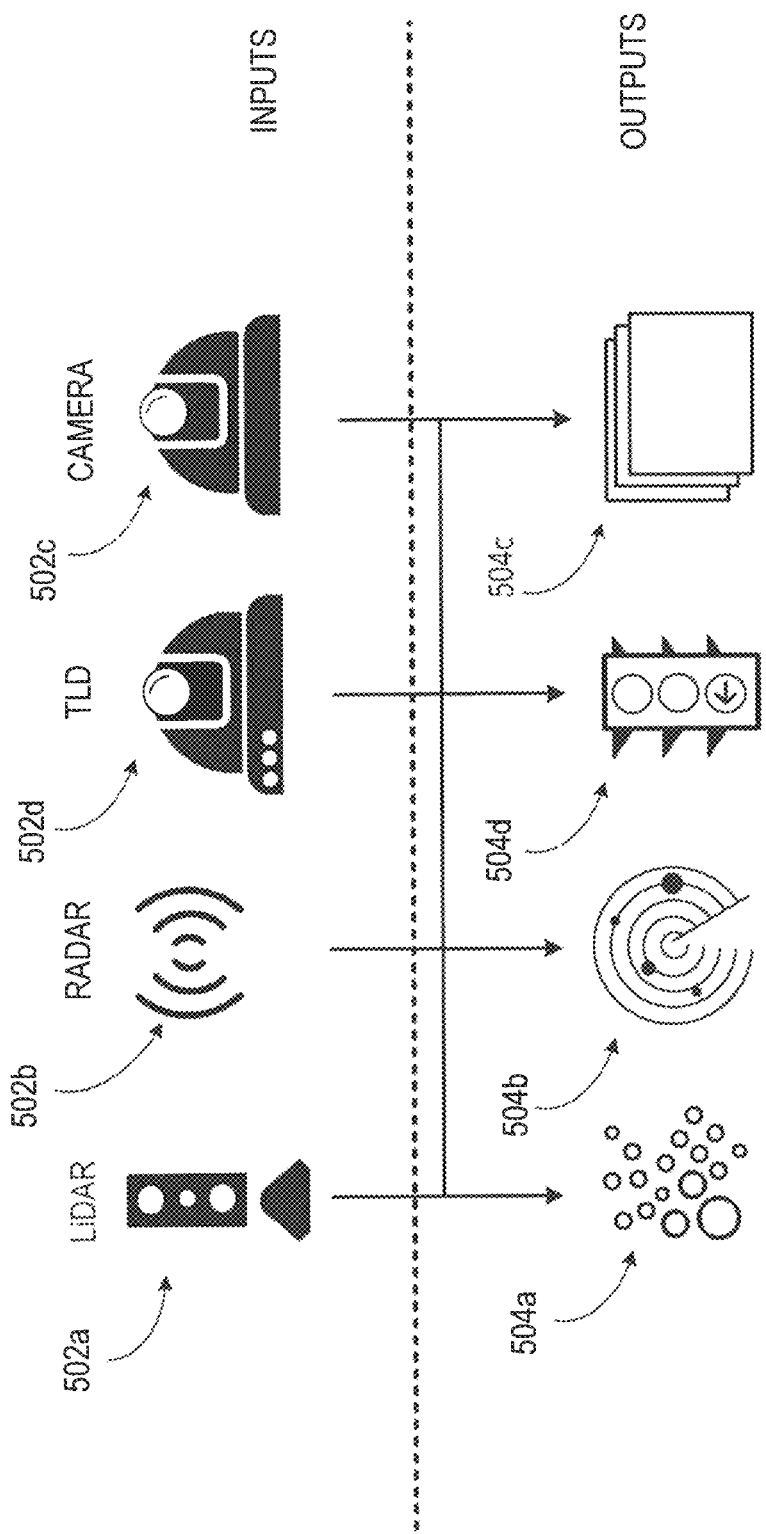
FIG. 5 illustrates an example of inputs and outputs that may be used by a perception module, in accordance with one or more embodiments.

FIG. 5 illustrates an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual operation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual operation information as possible, so that the AV 100 has access to all relevant operation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
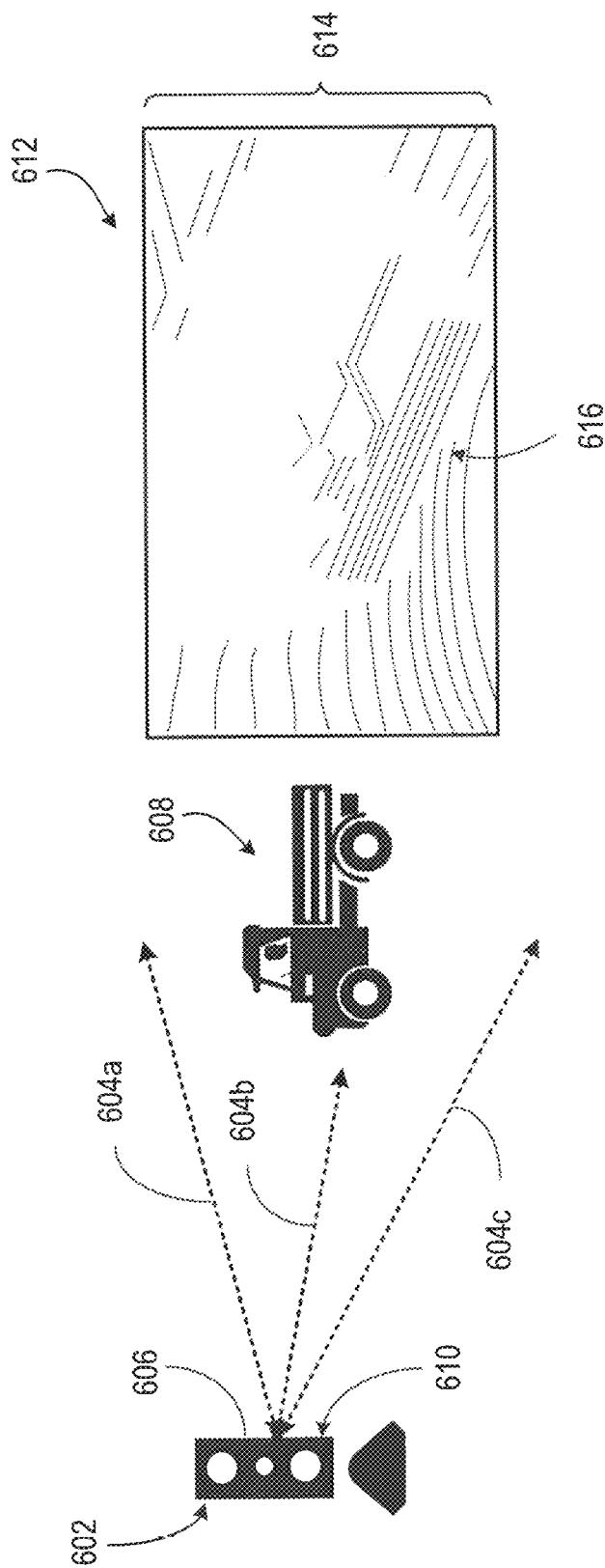
FIG. 6 illustrates an example of a LiDAR system, in accordance with one or more embodiments.

FIG. 6 illustrates an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
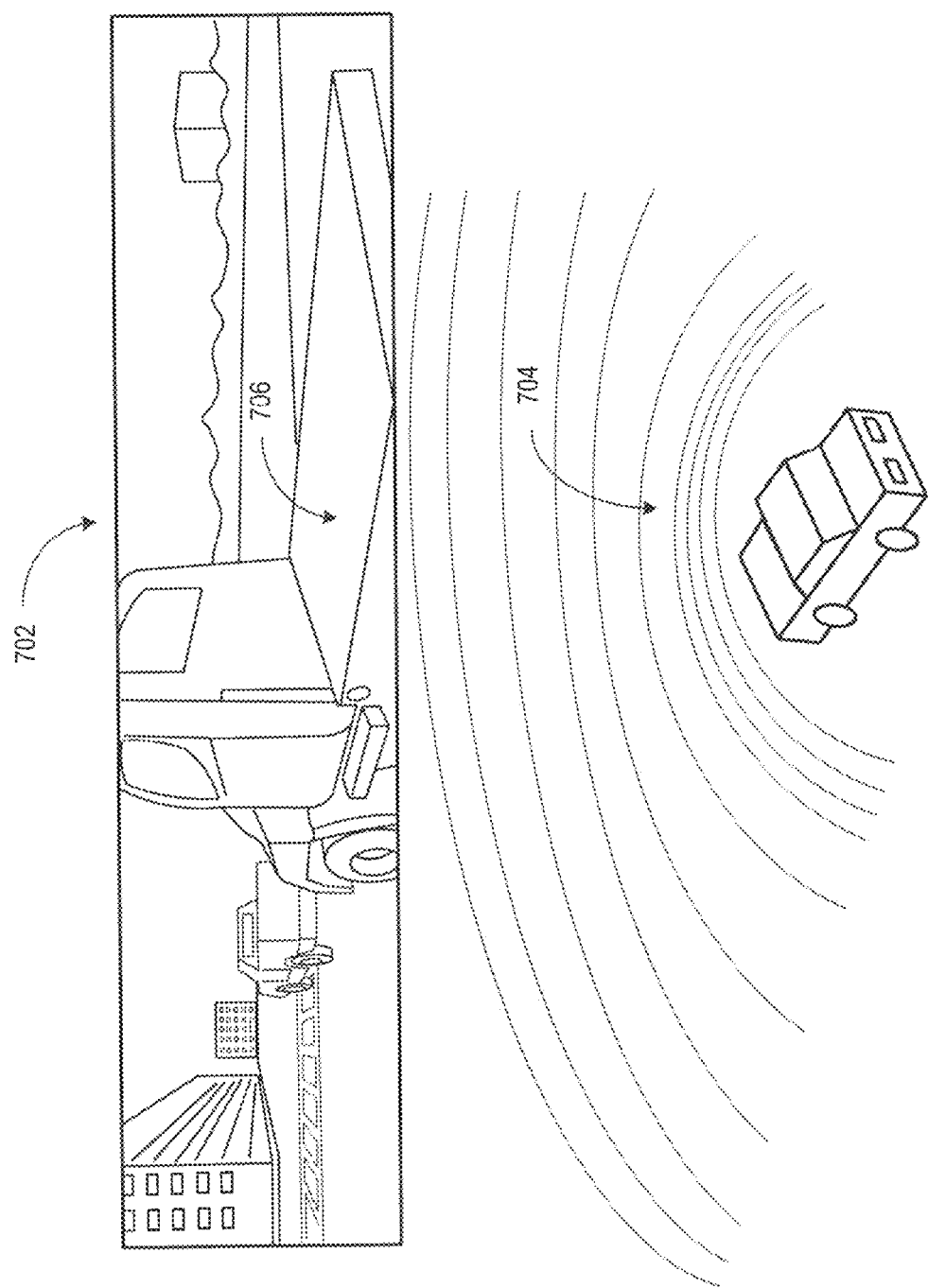
FIG. 7 illustrates the LiDAR system in operation, in accordance with one or more embodiments.

FIG. 7 illustrates the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
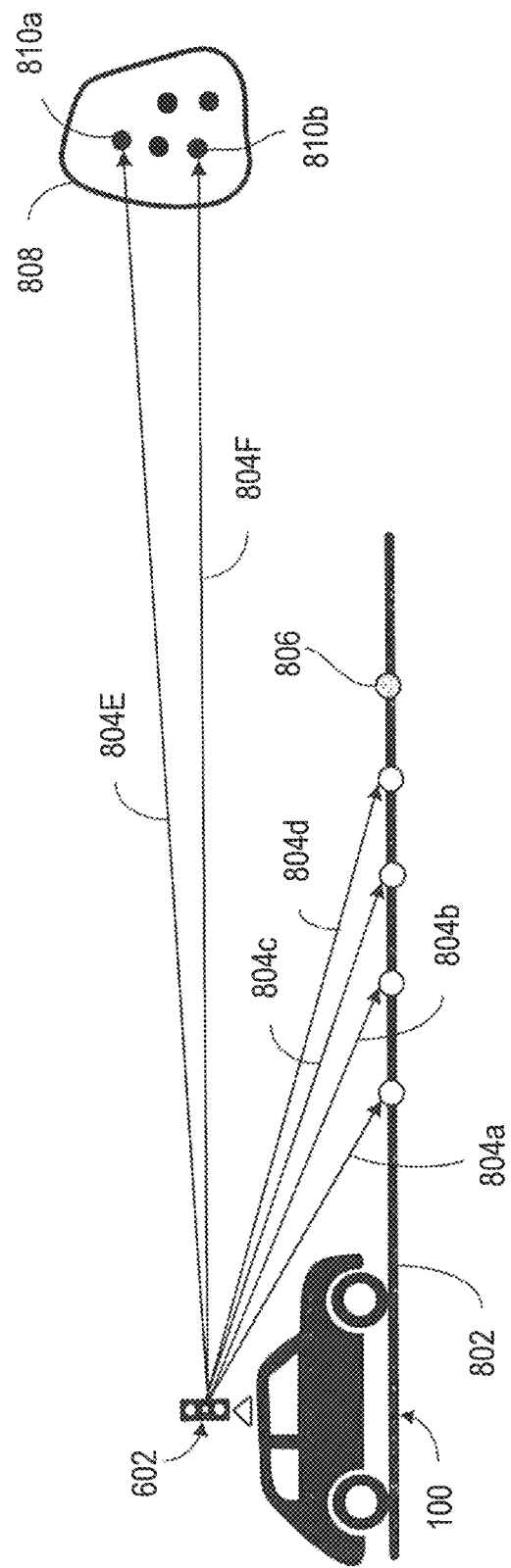
FIG. 8 illustrates the operation of the LiDAR system in additional detail, in accordance with one or more embodiments.

FIG. 8 illustrates the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
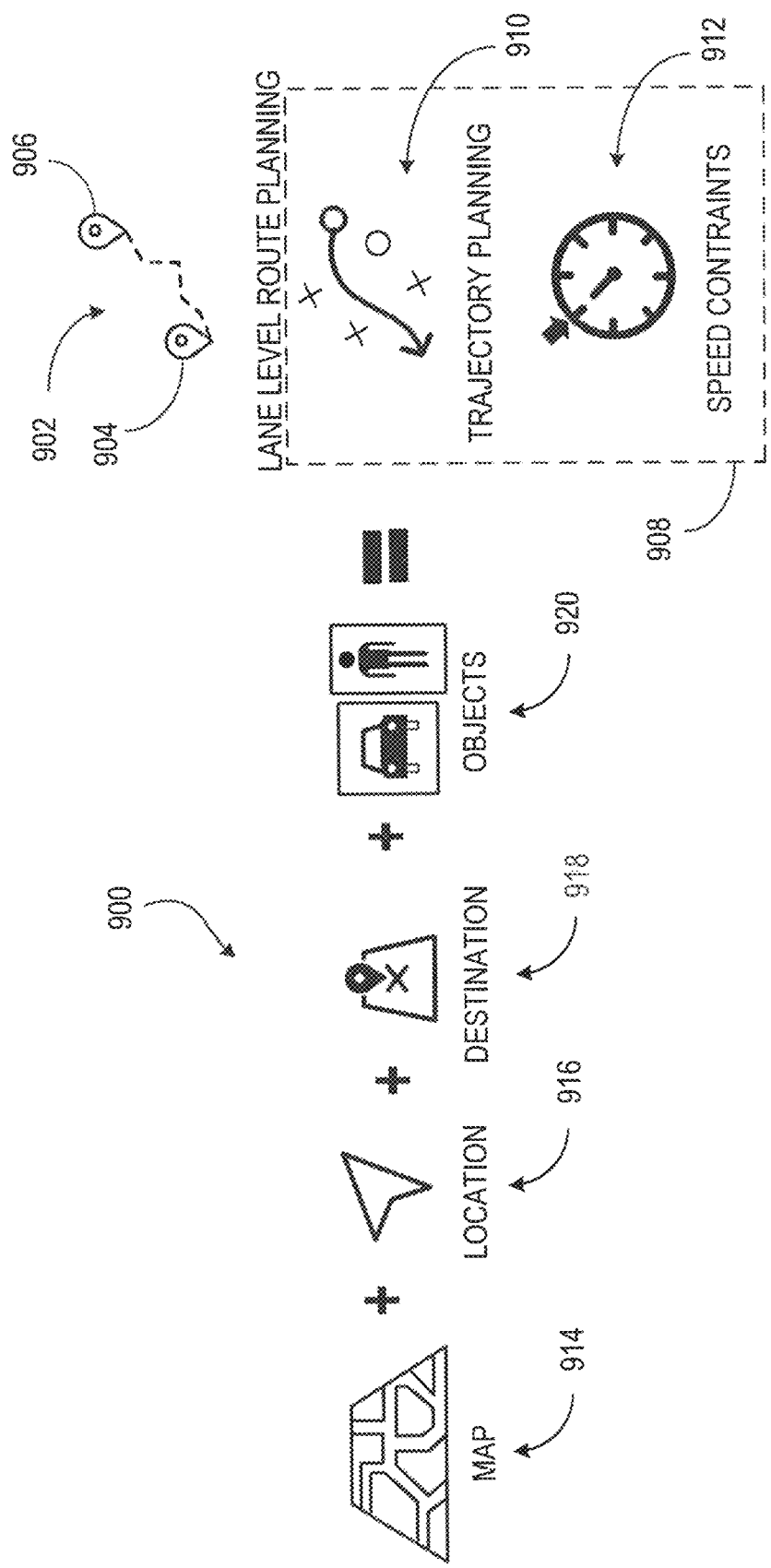
FIG. 9 illustrates a block diagram of the relationships between inputs and outputs of a planning module, in accordance with one or more embodiments.

FIG. 9 illustrates a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
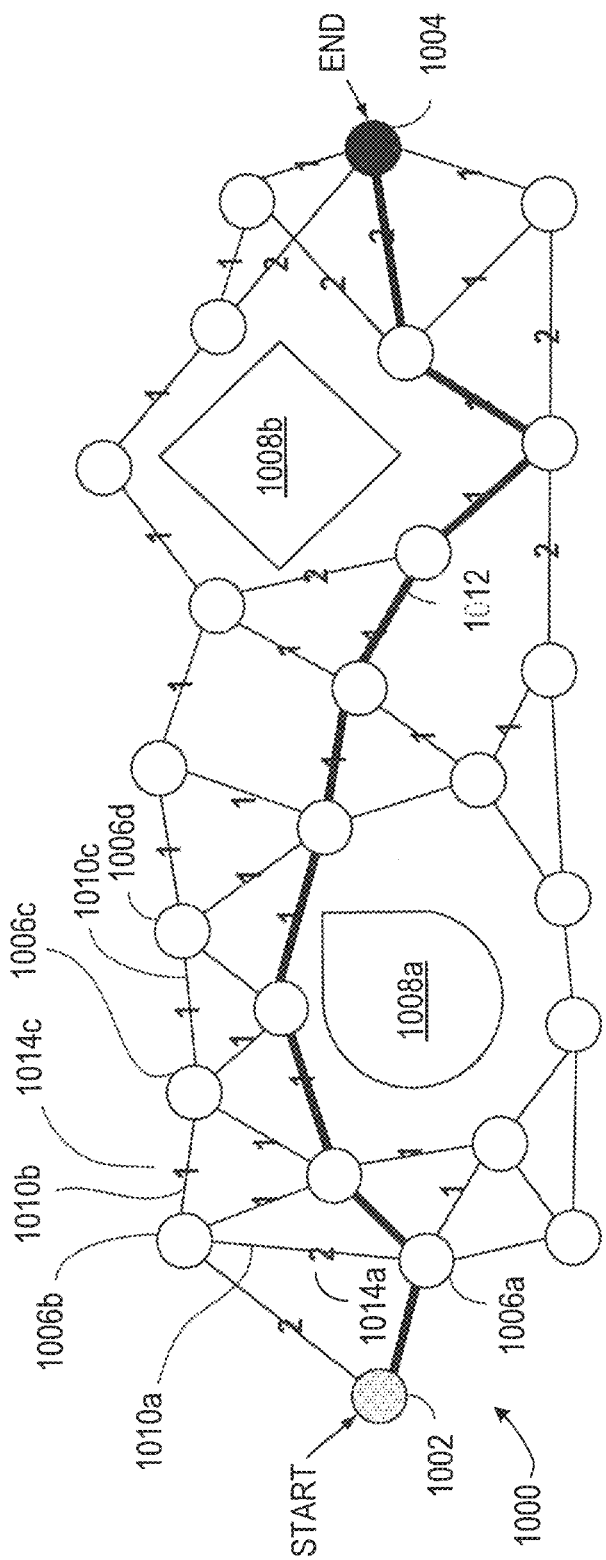
FIG. 10 illustrates a directed graph used in path planning, in accordance with one or more embodiments.

FIG. 10 illustrates a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
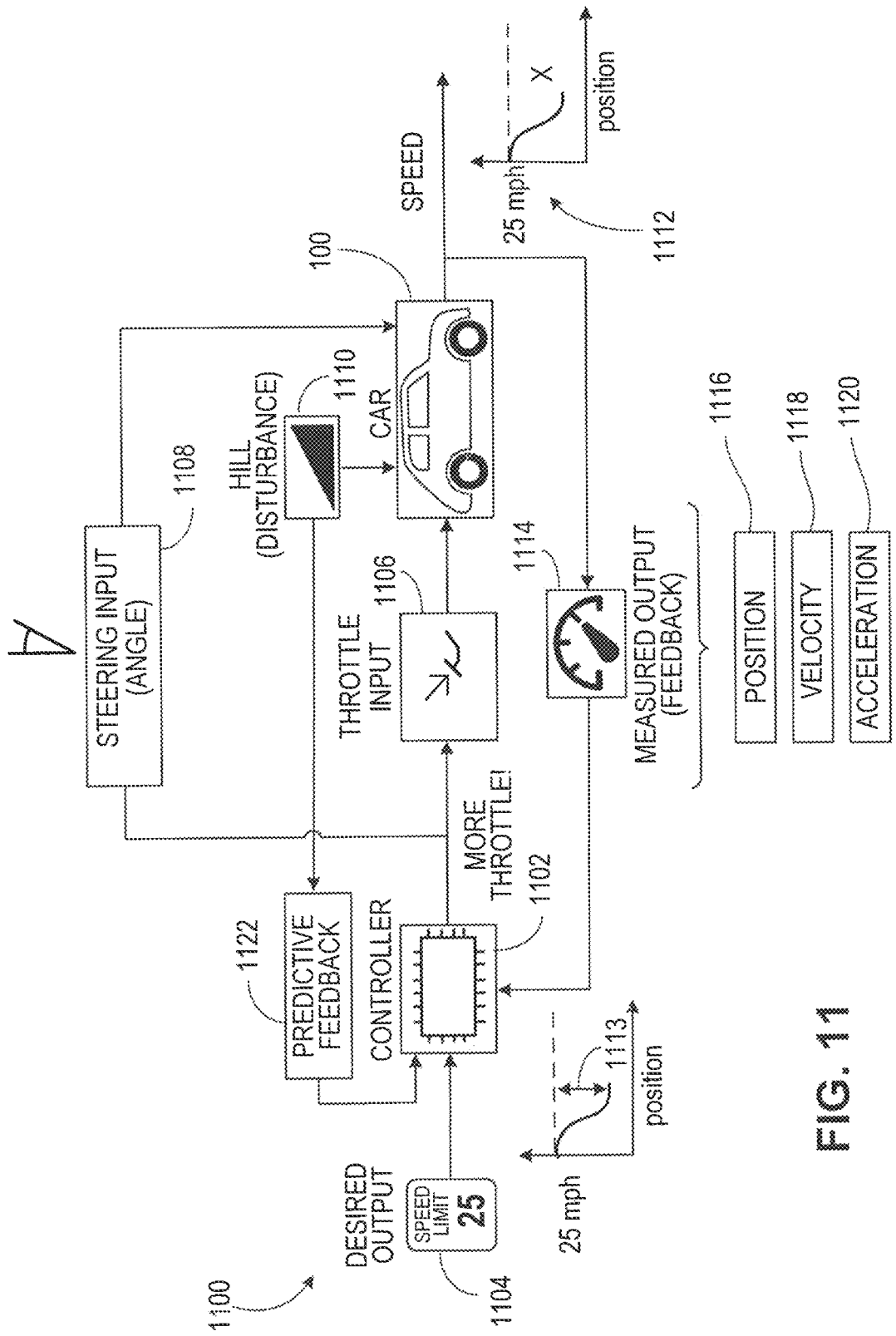
FIG. 11 illustrates a block diagram of the inputs and outputs of a control module, in accordance with one or more embodiments.

FIG. 11 illustrates a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
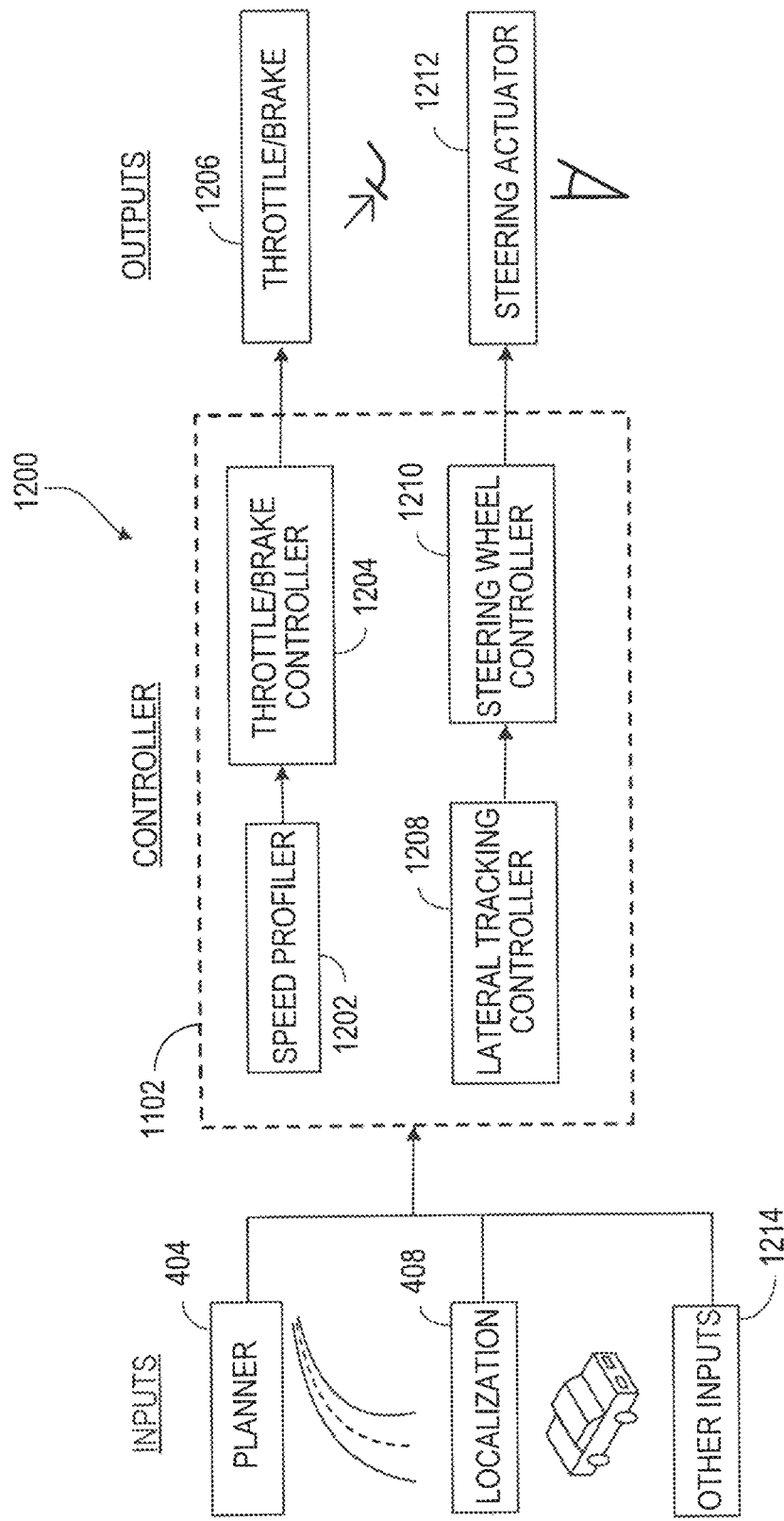
FIG. 12 illustrates a block diagram of the inputs, outputs, and components of a controller, in accordance with one or more embodiments.

FIG. 12 illustrates a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Architecture for Generating an Optimal Trajectory for Navigation of AVs

Figure 13:
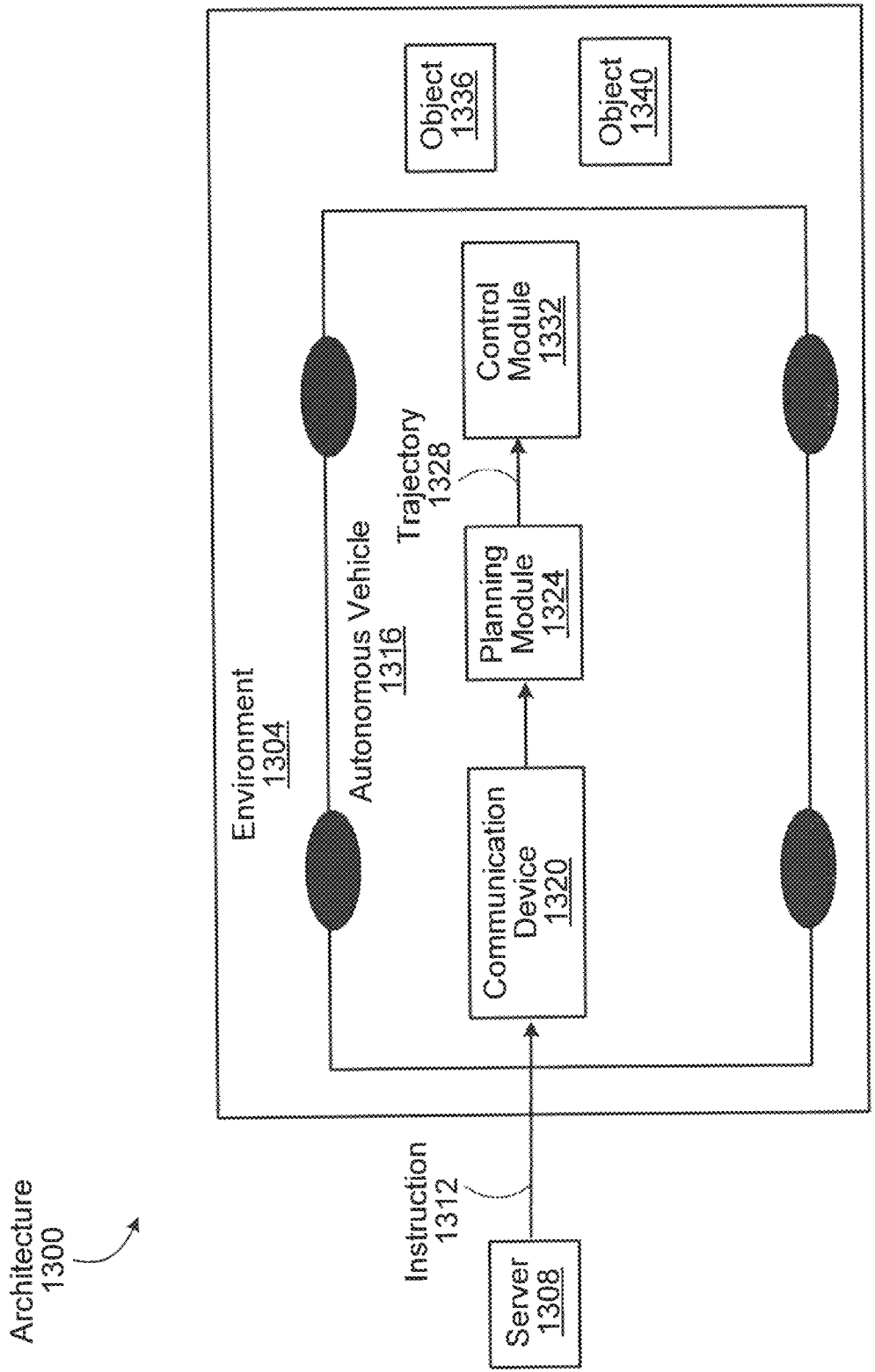
FIG. 13 illustrates a block diagram of an architecture for generating an optimal trajectory for navigation of an AV, in accordance with one or more embodiments.

FIG. 13 illustrates a block diagram of an architecture 1300 for generating an optimal trajectory for navigation of an AV 1316, in accordance with one or more embodiments. The architecture 1300 includes a server 1308 and an environment 1304. The environment 1304 represents a geographical area, such as a town, a neighborhood, or a road segment. In one embodiment, spatiotemporal locations within the environment 1304 are represented on an annotated map of the environment 1304. These spatiotemporal locations are used to generate the optimal trajectory for the AV 1316. The environment 1304 contains the AV 1316 and objects 1336 and 1340. The server 1308 may be an embodiment of the server 136 shown in FIG. 1 and the AV 1316 may be an embodiment of the AV 100 shown in FIG. 1. In other embodiments, the architecture 1300 includes additional or fewer components than those described herein. Similarly, the functions can be distributed among the components and/or different entities in a different manner than is described here.

The server 1308 is communicatively coupled to the AV 1316 and transmits one or more instructions 1312 to the AV 1316. In one embodiment, the server 1308 may be a "cloud" server as described in more detail above with reference to server 136 in FIGS. 1 and 2. Portions of the server 1308 may be implemented in software or hardware. For example, the server 1308 or a portion of the server 1308 may be part of a PC, a tablet PC, an STB, a smartphone, an internet of things (IoT) appliance, or any machine capable of executing instructions that specify actions to be taken by that machine.

The AV 1316 receives an instruction 1312 from the server 1308 or from a passenger within the AV 1316 for the AV 1316 to travel from an initial spatiotemporal location 904 to a destination spatiotemporal location 906 in FIG. 9. The initial spatiotemporal location and the destination spatiotemporal location include geographical coordinates, a travel time associated with the AV 1316 located at the geographical coordinates, or a heading, for example, directional orientation or pose of the AV 1316 located at the geographical coordinates. In one embodiment, the instruction 1312 includes GNSS coordinates, a name of a business, a street address, or a name of a city or town for the initial spatiotemporal location and the destination spatiotemporal location.

The AV 1316 is located within the environment 1304 that also includes objects 1336 and 1340, as described above with reference to objects 416 in FIGS. 4 and 5. The objects 1336 and 1340 are physical objects external to the AV 1316. For example, the objects 1336 and 1340 may each be another vehicle, a pedestrian, a cyclist, elements of a construction zone, a building, a traffic sign, etc. In one embodiment, the objects 1336 and 1340 are classified by the AV 1316 (e.g., grouped into types such as pedestrian, automobile, etc.) and data representing the classified objects 1336 and 1340 is provided to a planning module (e.g., 1324) of the AV 1316.

The AV 1316 includes a communication device 1320, the planning module 1324, and a control module 1332. The communication device 1320 may be an embodiment of the communication device 140 shown in FIG. 1, the planning module 1324 may be an embodiment of the planning module 404 shown in FIG. 4, and the control module 1332 may be an embodiment of the control module 106 shown in FIG. 1.

In other embodiments, the AV 1316 includes additional or fewer components than those described herein. Similarly, the functions can be distributed among the components and/or different entities in a different manner than is described here.

The communication device 1320 communicates data (e.g., instructions or measured or inferred properties of states and conditions of the AV 1316 or of other vehicles) with the server 1308, a passenger within the AV 1316, or other vehicles. The communication device 1320 is communicatively coupled to the server 1308 across a network. In an embodiment, the communications device 1320 communicates across the Internet, electromagnetic spectrum (including radio and optical communications) or other media (e.g., air and acoustic media). Portions of the communication device 1320 may be implemented in software or hardware. For example, the communication device 1320 or a portion of the communication device 1320 may be part of a PC, a tablet PC, an STB, a smartphone, an internet of things (IoT) appliance, or any machine capable of executing instructions that specify actions to be taken by that machine. The communication device 1320 is described in more detail above with reference to communication device 140 in FIG. 1.

In one embodiment, the communication device 1320 includes a touchscreen display or keyboard to receive instructions from a passenger within the AV 1316. The communication device 1320 receives the instruction 1312 from the server 1308 or from a passenger within the AV 1316 and transmits the instruction 1312 to the planning module 1324. The communication device 1320 translates the instruction 1312 from a human-readable format or natural language to a computer program, pseudocode, machine-language format, or assembly-level format for the planning module 1324 to use.

The planning module 1324 receives data representing a destination (e.g., 412) and determines data representing a trajectory (e.g., 414, sometimes referred to as a route) that can be traveled by the AV 1316 to reach (e.g., arrive at) the destination 412. The planning module 1324 is communicatively coupled to the communication device 1320 to receive the instruction 1312. In one embodiment, portions of the planning module 1324 are implemented in software or hardware. For example, the planning module 1324 or a portion of the planning module 1324 may be part of a PC, a tablet PC, an STB, a smartphone, an internet of things (IoT) appliance, or any machine capable of executing instructions that specify actions to be taken by that machine. The planning module 1324 is described in more detail above with reference to planning module 404 in FIG. 4.

The planning module 1324 uses a directed graph representation of the drivable regions in the environment 1304 to generate a trajectory 414 including a plurality of travel segments. Each travel segment (e.g., edge 1010*a* in FIG. 10) represents a portion of the trajectory 414. In one embodiment, a travel segment includes a section of a road, a bridge, a change of lanes, an elevation, etc. Each travel segment of the plurality of travel segments begins at a first spatiotemporal location (an intermediate point in the trajectory) of a plurality of spatiotemporal locations and terminates at a second spatiotemporal location (another intermediate point in the trajectory) of the plurality of spatiotemporal locations. The plurality of spatiotemporal locations includes the initial spatiotemporal location and the destination spatiotemporal location.

Each travel segment in the trajectory is associated with a plurality of operational metrics. The operational metrics represent an N-tuple of costs associated with navigating the AV 1316 along the travel segment from the first spatiotemporal location to the second spatiotemporal location. In one embodiment, if eight different operational metrics are used, the N-tuple is represented as (m1, m2, m3, m4, m5, m6, m7, m8). In this example, m1 represents the length of a travel segment, m2 represents the number of traffic lights on the travel segment, m3 represents the number of predicted collisions with other vehicles on the travel segment, etc. A cost function of the plurality of operational metrics is used to determine the cost of a candidate trajectory. Each operational metric in the N-tuple is maximized or summed across the travel segments in the candidate trajectory. In one embodiment, the cost function is represented as (+, +, max, +, max, max, +, +), indicating that the first and second elements in the N-tuple are summed, the third element is maximized, and so on. The operational metrics m1, m2, m4, m7, and m8 are summed, while the operational metrics m3, m5 and m6 are maximized. Therefore, the length of the travel segments and the number of traffic lights are summed, while the number of predicted collisions is maximized. If the maximum number of predicted collisions equals one or more, the candidate trajectory is discarded.

In one embodiment, the planning module 1324 evaluates the cost (associated with a particular operational metric, e.g., m1) of navigating the AV 1316 along a particular trajectory as a sum of the costs associated with the operational metric across the trajectory (e.g., distance traveled) or as a binary function to block the particular trajectory (e.g., when a certain trajectory includes a travel segment associated with a predicted collision). For example, the plurality of operational metrics associated with a particular travel segment in a road network may denote a length of the travel segment, a number of traffic lights on the travel segment, or a number of predicted collisions with other vehicles on the travel segment. The planning module 1324 generates the trajectory for the AV 1316 by optimizing each operational metric of the plurality of operational metrics across the plurality of travel segments.

The control module 1332 is communicatively coupled to the planning module 1324. The control module 1332 receives data representing the trajectory and data representing the present AV position (e.g., 418 in FIG. 4), and operates the control functions (e.g., 420*a-c*-steering, throttling, braking, ignition) of the AV in a manner that will cause the AV 1316 to travel along the trajectory to the destination spatiotemporal location. In one embodiment, portions of the control module 1332 are implemented in software or hardware. For example, the control module 1332 or a portion of the control module 1332 may be part of a PC, a tablet PC, an STB, a smartphone, an internet of things (IoT) appliance, or any machine capable of executing instructions that specify actions to be taken by that machine. The control module 1332 is described in more detail above with reference to control module 406 in FIGS. 4 and 11.

Figure 14:
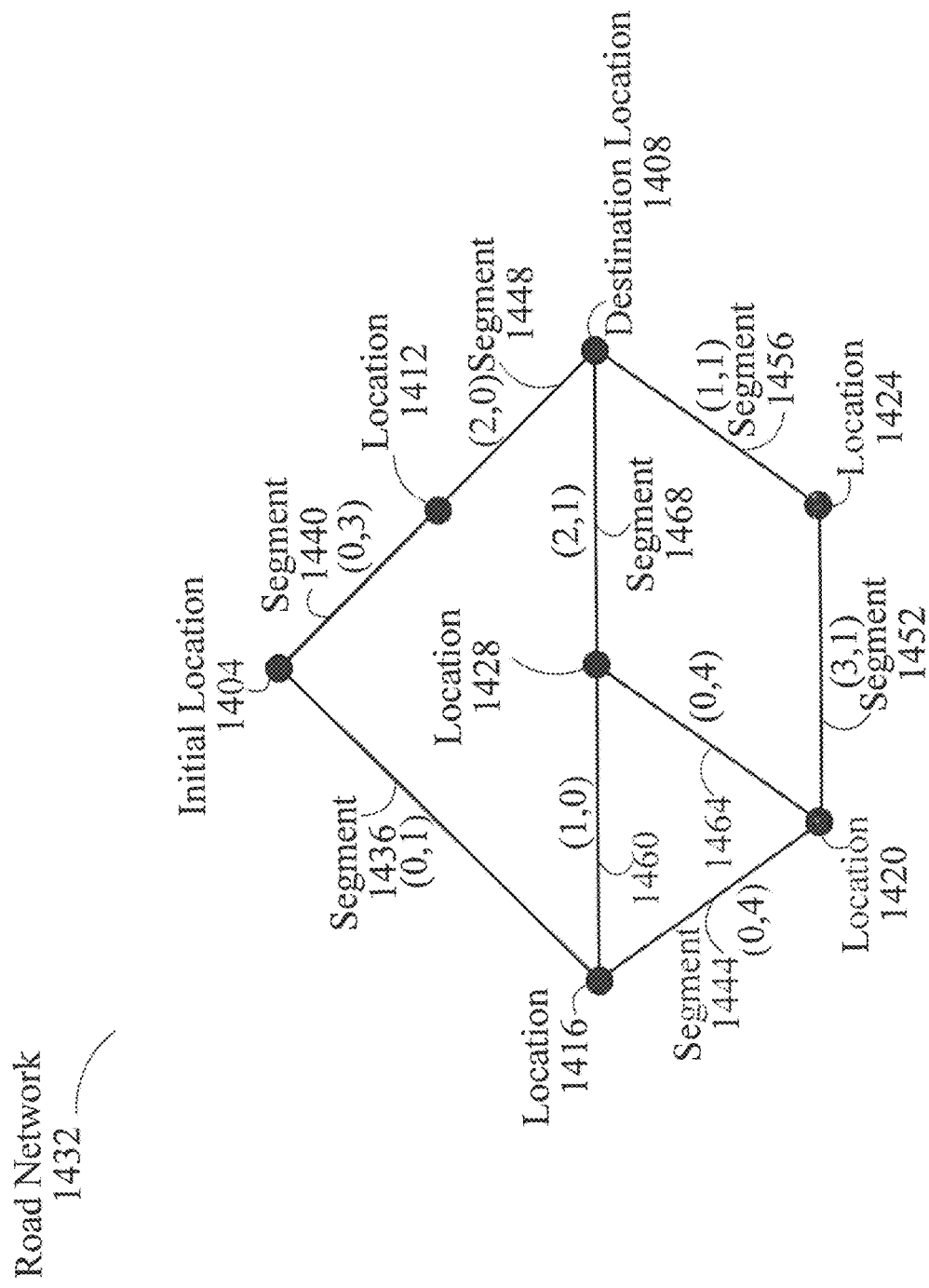
FIG. 14 illustrates a method for generating an optimal trajectory for navigation of an AV across a road network, in accordance with one or more embodiments.

Method for Generating an Optimal Trajectory for Navigation Across a Road Network FIG. 14 illustrates a method for generating an optimal trajectory for navigation of an AV (e.g., AV 1316 shown in FIG. 1) across a road network 1432, in accordance with one or more embodiments. The road network 1432 includes a plurality of spatiotemporal locations—1404, 1416, 1412, 1428, 1408, 1420, and 1424—at which the AV 1316 may be located. In one embodiment, the AV 1316 is initially located at spatiotemporal location 1404, which is referred to as the source location or initial location. The road network 1432 includes a plurality of travel segments (e.g., 1436, 1440, 1444, 1448, 1452, 1456, 1460, 1464, and 1468), wherein each travel segment (e.g., 1436) begins at a first spatiotemporal location 1404 and terminates at a second spatiotemporal location 1416.

A planning module 1324 of the AV 1316 receives an instruction 1312 from a server 1308 or from a passenger within the AV 1316 for the AV 1316 to travel from the initial spatiotemporal location 1404 to the spatiotemporal location 1408, which is referred to as the destination spatiotemporal location or final spatiotemporal location. To navigate the AV 1316, the planning module 1324 generates a trajectory for the AV 1316. The trajectory includes a plurality of travel segments connecting the initial spatiotemporal location 1404 and the destination spatiotemporal location 1408. Each travel segment (e.g., 1436) of the trajectory begins at a first spatiotemporal location (e.g., 1404) and terminates at a second spatiotemporal location (e.g., 1416).

Each travel segment (e.g., 1436) is associated with a plurality of operational metrics. For example, the operational metrics (0, 1) are associated with 1436 as shown in FIG. 14. The operational metrics are associated with navigating the AV 1316 from the first spatiotemporal location 1404 to the second spatiotemporal location 1416 connected by the travel segment 1436. Each operational metric refers to a parametric cost that the AV 1316 will incur by traveling along the travel segment 1436. Each operational metric (e.g., parametric cost) of the plurality of operational metrics is optimized across the plurality of travel segments to generate the trajectory.

In one embodiment, each operational metric of the plurality of operational metrics is maximized or minimized across the trajectory. In one embodiment, a sum of values of each operational metric is maximized or minimized across the trajectory. The cost of a travel segment is assigned a single non-negative real number. The total cost of a route or trajectory is defined to be the sum of the cost of the route's travel segments. However, for certain types of operational metrics that are related to human safety (e.g., a number of collisions), the value of the operational metric across the trajectory must often be maximized or minimized instead of summed. For example, a candidate trajectory that includes a single collision should be avoided or the maximum value of the acceleration that the AV 1316 will experience across a candidate trajectory should be minimized. In embodiments, therefore, the cost of a candidate trajectory is defined as a maximal value of costs of individual travel segments. The plurality of operational metrics associated with a travel segment is represented by an N-dimensional tuple (m1, m2, . . . , mN). In generating the trajectory, some operational metrics (e.g., m1 and mN) are summed, while others (e.g., m2) are maximized, e.g., (+, max, . . . , +).

The planning module 1324 evaluates each candidate trajectory as a partial tree of paths to be expanded based on the cost of navigating the AV 1316 along the candidate trajectory. In one embodiment, a shortest path algorithm is used to generate an optimal result for all operational metrics coordinates up to and including the first maximized operational metric. The planning module 1324 determines a trajectory between the initial spatiotemporal location 1404 and the destination spatiotemporal location 1408, such that the sum of the costs of the constituent travel segments is minimized. In other embodiments, the planning module 1324 uses a variant of Dijkstra's algorithm, the Bellman-Ford algorithm, the A* search algorithm, the Floyd-Warshall algorithm, Johnson's algorithm, or the Viterbi algorithm to generate candidate trajectories.

The planning module 1324 uses the shortest path algorithm to generate candidate trajectories by optimally computing the cost up to and including the first maximized operational metric, e.g., up to m2 wherein m2 is the first maximized coordinate. Travel segments whose operational metric cost has an m2 value that is greater than the optimal value for the m2 operational metric are discarded. The shortest path algorithm is used a second time to generate the costs of candidate trajectories up to a second maximized operational metric. This process is repeated K times, wherein K is the number of maximized operational metrics.

In one embodiment, an operational metric of the plurality of operational metrics associated with a travel segment (e.g., 1436) denotes a predicted acceleration or deceleration of the AV 1316 when traveling along the travel segment 1436. The generating of the trajectory includes selecting travel segments associated with the predicted acceleration or deceleration less than a threshold to increase passenger comfort, reduce wear and tear on the AV 1316, or increase efficiency or fuel mileage. In another embodiment, an operational metric of the plurality of operational metrics associated with a travel segment (e.g., 1436) denotes an amount of road surface damage of the travel segment 1436 (e.g., a number of potholes, stripped blacktop pavement, etc.). The generating of the trajectory includes selecting travel segments associated with the amount of road surface damage less than a threshold to increase passenger comfort or reduce wear and tear on the AV 1316.

In one embodiment, the generating of the trajectory includes discarding travel segments (e.g., 1436) associated with an operational metric having a value that is greater or lesser than an optimal value for the operational metric. For example, when an operational metric related to human safety (e.g., number of predicted collisions) is non-zero, the planning module 1324 can terminate evaluation of the candidate trajectory to reduce computation time.

In one embodiment, the generating of the trajectory includes responsive to a value of an operational metric associated with a travel segment (e.g., 1436) of a candidate trajectory falling below a threshold, terminating, using the one or more processors, evaluation of the candidate trajectory. For example, cost evaluation is performed to determine the cost of a trajectory for the AV 1316. Aggregating (e.g., summing, applying a maximum operator, multiplying, or ranking) the operational metrics associated with the plurality of travel segments is used to determine the cost of the trajectory. The planning module 1324 compares the determined costs of candidate trajectories to identify an optimal candidate trajectory.

In one embodiment, different cost functions of the plurality of operational metrics are used to determine the cost of a trajectory. A cost function may include a Boolean indicator indicating whether a candidate trajectory satisfies a strategic guideline or all the strategic guidelines of a priority group of operational metrics. In one embodiment, the optimizing of each operational metric of the plurality of operational metrics across the plurality of travel segments to generate the trajectory includes ranking each operational metric of the plurality of operational metrics that is associated with navigational safety higher than an operational metric of the plurality of operational metrics that is not associated with navigational safety. The operational metrics of the plurality of operational metrics that are associated with navigational safety are optimized before the operational metrics not associated with navigational safety. The cost evaluation is performed based on the ranked priority of the plurality of operational metrics. The cost evaluation iterates through higher-ranked operational metrics to lower-ranked operational metrics. For example, an operational metric (e.g., a predicted number of collisions of the AV 1316 with other vehicles) related to human safety is ranked higher, and the cost evaluation begins with this higher-ranked operational metric. When two candidate travel segments or two candidate trajectories have the same value for a higher-ranked operational metric, the cost evaluation proceeds to the next lower-ranked operational metric, e.g., reducing driving time. In this manner, the cost evaluation iterates down the lower-ranked operational metrics until an optimal trajectory is generated. The ranking and priority of rules for navigation is explained in additional detail above with reference to FIG. 9.

Turning now to FIG. 14, the road network includes 7 spatiotemporal locations as described above. Each travel segment is associated with a pair of operational metrics (m1, m2). Consider the cost function to generate an optimal trajectory from 1404 to 1408 to be (max, +). That is, the first operational metric m1 is to be maximized, while the second operational metric m2 is to be summed. If a traditional route selection process is used, the shortest path from 1404 to 1408 is found to be 1404→1412→1408, which has a cost of (2, 3). The optimal trajectory, however, is 1404→1416→1428→1408, which has a cost of (2, 2).

To generate the optimal trajectory, the planning module 1324 determines an optimal cost for the first operational metric m1 to be maximized. More precisely, given an N-dimensional operational metric vector wherein the first maximized operational metric is K, such that 1≥K≥N, the cost of the trajectory determined in the first iteration is optimal for the first K operational metrics. After the first iteration, the planning module 1324 determines that the cost of an optimal trajectory for the first operational metric m1 is 2. To begin the second iteration, the planning module 1324 discards the travel segments that have a value for m1>2 since none of those travel segments can lie on the optimal trajectory. The travel segment 1452 between 1420 and 1424 and having operational metrics (3, 1) is discarded. The cost of the trajectory 1404→1416→1428→1408 generated in the second iteration has a cost of (2, 2) and this is indeed an optimal trajectory.

In some embodiments, one or more processors 146 of the AV 1316 are used to generate a plurality of travel segments (e.g., segments 1436, 1460, etc.) for navigating the AV 1316. The plurality of travel segments is associated with a plurality of operational metrics (e.g., m1, m2, etc.). The one or more processors 146 rank each operational metric of the plurality of operational metrics. The ranking is performed such that a first operational metric (e.g., m1) of the plurality of operational metrics that is associated with navigational safety is ranked higher than a second operational metric (e.g., m2) of the plurality of operational metrics that is different from the first operational metric m1. Travel segments are selected for navigating the AV 1316, such that each operational metric associated with the selected travel segments is optimized in accordance with a rank of the operational metric. Using a control module 1332, the AV 1316 is navigated in accordance with the selected travel segments.

In some embodiments, the optimizing of each operational metric associated with the selected travel segments includes maximizing a value of the operational metric across the selected travel segments. The optimizing of each operational metric includes maximizing or minimizing a sum of values of the operational metric across the selected travel segments. In some embodiments, each travel segment is associated with a spatiotemporal location including geographical coordinates, a travel time associated with the vehicle located at the geographical coordinates, or a heading of the vehicle located at the geographical coordinates.

In some embodiments, an operational metric denotes a number of predicted collisions of the AV 1316 with objects, such as object 1336, when traveling along the travel segment. In some embodiments, the selecting of the travel segments for navigating the AV 1316 includes selecting a travel segment associated with the number of predicted collisions less than a threshold. In some embodiments, an operational metric denotes a number of predicted stops for the AV 1316 when traveling along a travel segment. The selecting of the travel segments for navigating the AV 1316 includes selecting a travel segment associated with the number of predicted stops less than a threshold to reduce travel time.

In some embodiments, an operational metric denotes a predicted lateral clearance between the AV 1316 and an object, such as object 1336, when traveling along a travel segment. The selecting of the travel segments for navigating the AV 1316 includes selecting a travel segment associated with the predicted lateral clearance between the AV 1316 and the object 1336 greater than a threshold. In some embodiments, an operational metric denotes a predicted acceleration or deceleration of the AV 1316 when traveling along a travel segment. The selecting of the travel segments for navigating the AV 1316 includes selecting a travel segment associated with the predicted acceleration or deceleration less than a threshold.

In some embodiments, an operational metric denotes an amount of road surface damage of a travel segment. The selecting of the travel segments for navigating the AV 1316 includes selecting a travel segment associated with an amount of road surface damage less than a threshold to increase passenger comfort. In some embodiments, the selecting of the travel segments for navigating the AV 1316 includes discarding a travel segment associated with an operational metric having a value that is greater or lesser than an optimal value for the operational metric. A partial trajectory is generated comprising the selected travel segments. Responsive to a value of an operational metric associated with the partial trajectory falling below a threshold, evaluation of the partial trajectory is terminated using the one or more processors 146 to reduce computation time and effort.

The benefits and advantages of the embodiments disclosed herein are that navigating an AV along the generated trajectory results in increased passenger and pedestrian safety, lower wear and tear on the AV, reduced travel time, a reduced travel distance, etc. Increased safety for other vehicles on the road network is also achieved. Reducing the number of stops for the AV increases fuel efficiency, reduces battery drain, and increases passenger comfort. If the value of the highest-ranked operational metric is 0, then the costs of the candidate trajectories after the first iteration of the method can be determined correctly up to the second operational metric. Therefore, the method needs to be iteratively run only for non-zero maximized operational metrics, leading to reduced computation time. When a higher-ranked operational metric (related to human safety) is non-zero, the planning module 1324 can terminate evaluation of the candidate trajectory to further reduce computation time.

Figure 15:
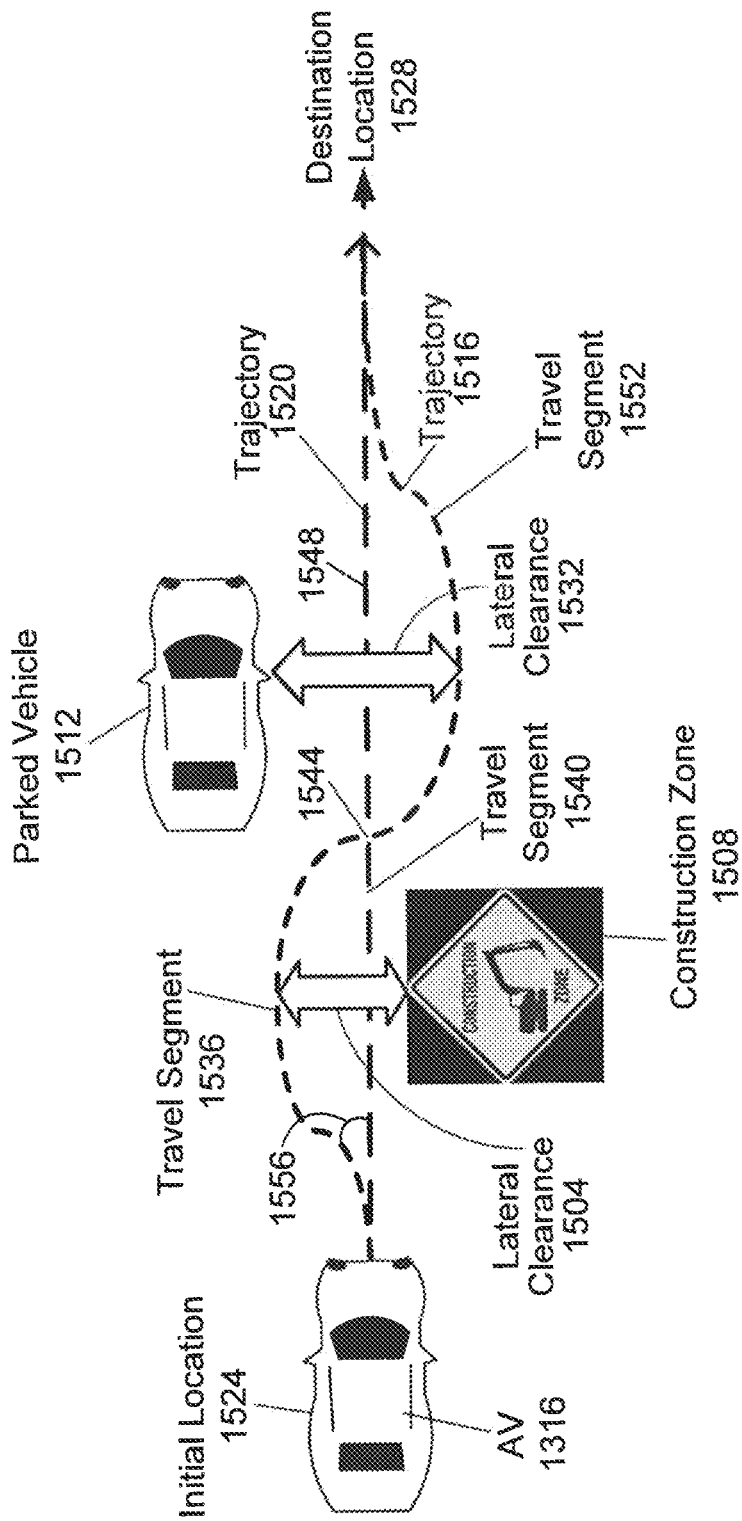
FIG. 15 illustrates an example of generating an optimal trajectory for an AV to increase lateral clearance from other objects and/or decrease the maximum change in steering angle along the trajectory, in accordance with one or more embodiments.

Generation of Optimal Trajectories to Increase Lateral Clearance from Other Objects FIG. 15 illustrates an example of generating an optimal trajectory for the AV 1316 to increase lateral clearance from other objects, 1508 or 1512, and/or decrease the maximum change in steering angle along the trajectory, in accordance with one or more embodiments. In one embodiment, an operational metric associated with a travel segment (e.g., 1536 shown in FIG. 15) denotes a predicted lateral clearance between the AV 1316 and object 1508 when traveling along the travel segment 1536. The planning module is configured to increase the lateral distance of the AV 1316 from stationary obstacles on the road even if they are not directly impeding the path of the AV 1316, for example, parked vehicle 1512. While traditional route selection methods may attempt to increase a lateral distance from an obstacle when it is encountered, the embodiments disclosed herein increase the lateral clearance globally for all objects, thereby providing a shorter, reduced cost, more optimal trajectory.

Turning now to FIG. 15, the generating of the trajectory includes selecting travel segments associated with a predicted lateral clearance between the AV 1316 and other objects (e.g., 1508) greater than a threshold to avoid collisions or increase passenger comfort. An operational metric associated with the travel segment 1536 denotes a predicted lateral clearance 1504 between the AV 1316 and construction zone 1508 when traveling along the travel segment 1536. The generating of the trajectory includes selecting travel segments associated with a predicted lateral clearance between the AV 1316 and the object 1508 greater than a threshold.

FIG. 15 illustrates the AV 1316 initially located at the initial spatiotemporal location 1524. The AV 1316 receives an instruction (e.g., 1312) to travel from the initial spatiotemporal location 1524 to a destination spatiotemporal location 1528. To travel from the initial spatiotemporal location 1524 to the destination spatiotemporal location 1528, the AV 1316 must first travel to intermediate spatiotemporal location 1544. To travel from the initial spatiotemporal location 1524 to intermediate spatiotemporal location 1544, the AV 1316 selects either travel segment 1536 or travel segment 1540. Travel segment 1536 bends away from the construction zone 1508 and has lateral clearance 1504. Travel segment 1540 has less lateral clearance to the construction zone 1508.

The travel segments (e.g., 1536 and 1540) shown in FIG. 15 are associated with several operational metrics, e.g., lateral clearance from other objects or a maximum (swing) change in steering angle (e.g., 1556). The maximum change in steering angle is optimized to reduce the AV 1316 swinging from side to side along a lane to increase passenger comfort. In FIG. 15, selecting the travel segment 1536 increases lateral clearance (1504) of the AV 1316 from construction zone 1508. However, the maximum change in steering angle 1556 may also increase. Selecting the travel segment 1540 reduces lateral clearance of the AV 1316 from construction zone 1508. However, the maximum change in steering angle is not increased, which increases passenger comfort.

In one embodiment, the optimizing of each operational metric across the plurality of travel segments (e.g., 1536 and 1540) to generate the trajectory includes ranking each operational metric that is associated with navigational safety (e.g., lateral clearance of the AV 1316 from object 1508) higher than an operational metric that is not associated with navigational safety (e.g., maximum change in steering angle). The operational metrics that are associated with navigational safety are optimized ahead in priority of the operational metrics not associated with navigational safety. For example, the lateral clearance operational metric is related to safety and is ranked higher than the change in steering angle operational metric. Therefore, the AV 1316 will optimize (reduce) the lateral clearance operational metric and select travel segment 1536 instead of the travel segment 1540.

Similarly, to travel from spatiotemporal location 1544 to the destination spatiotemporal location 1528, the AV 1316 selects between travel segments 1548 and 1552. Selecting the travel segment 1552 increases lateral clearance of the AV 1316 from the parked vehicle 1512. However, the maximum change in steering angle may also increase. Selecting the travel segment 1548 reduces lateral clearance of the AV 1316 from the parked vehicle 1512. However, the maximum change in steering angle may reduce, which increases passenger comfort. If the operational metric related to lateral clearance is ranked higher than the operational metric related to the maximum change in steering angle, the AV 1316 will select travel segments 1536 and 1552 to travel from 1524 to 1528, therefore generating trajectory 1516. If portions of the trajectory 1516 are associated with non-optimal changes in steering angle, the AV 1316 selects travel segments 1540 and 1548 to travel from 1524 to 1528, therefore generating trajectory 1520.

Generation of Optimal Trajectories to Reduce Stops

Figure 16:
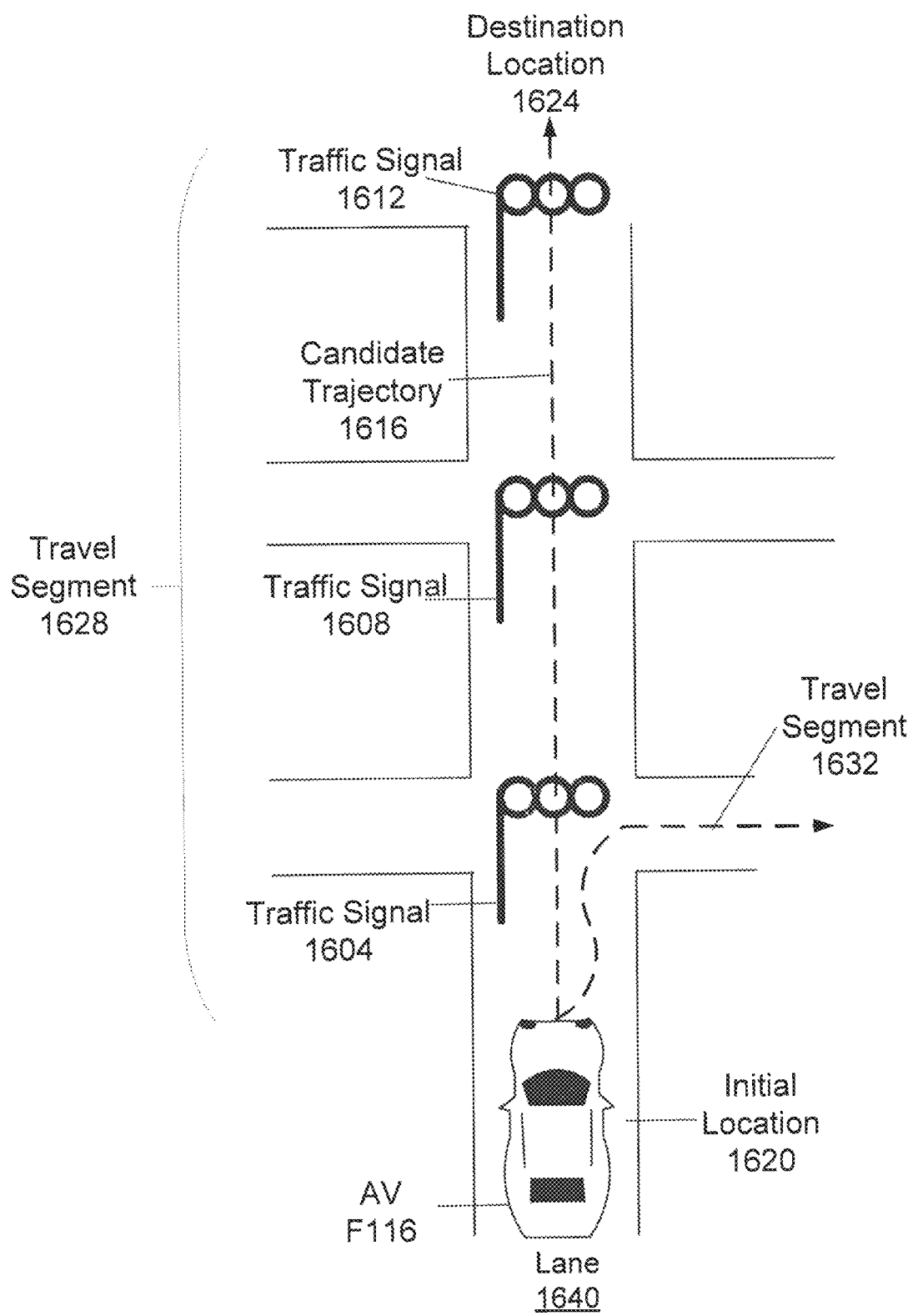
FIG. 16 illustrates an example of generating an optimal trajectory for an AV to reduce the number of stops along the trajectory, in accordance with one or more embodiments.

FIG. 16 illustrates an example of generating an optimal trajectory for the AV 1316 to reduce the number of stops along the trajectory, in accordance with one or more embodiments. In one embodiment, an operational metric of the plurality of operational metrics associated with a travel segment (e.g., 1628) denotes a number of predicted stops for the AV 1316 when traveling along the travel segment 1628. When generating candidate trajectories, the planning module 1324 may be configured to generate a trajectory to the destination spatiotemporal location 1624 having the highest average speed. However, if the AV 1316 travels along a first candidate trajectory having lower traffic congestion, the AV 1316 may experience frequent stops (e.g., from traffic signals 1604, 1608, and 1612, stop signs, etc., where the AV 1316 has to come to a complete stop).

A second candidate trajectory may have relatively higher traffic congestion but no stops. Even if the average speed for the first candidate trajectory is higher than for the second candidate trajectory, the planning module 1326 may select the second candidate trajectory to increase fuel inefficiency, reduce battery drain, reduce unnecessary wear and tear on the AV 1316, and increase passenger comfort. In this example, the generating of the trajectory includes selecting travel segments associated with the number of predicted stops less than a threshold, e.g., 1, 3 or 4.

Turning now to FIG. 16, the AV 1316 initially is located at the initial spatiotemporal location 1620 on lane 1640. The AV 1316 receives an instruction (e.g., 1312) to travel to the destination spatiotemporal location 1624. There is a single travel segment 1628 on a candidate trajectory 1616 connecting the initial spatiotemporal location 1620 and the destination spatiotemporal location 1624. The travel segment 1628 on lane 1640 has three traffic signals 1604, 1608, and 1612. The AV 1316 predicts that each traffic signal on the travel segment 1628 will result in a stop for the AV 1316; therefore the travel segment 1628 is associated with 3 predicted stops. The value of the operational metric in FIG. 4 (associated with the number of stops) for the travel segment 1628 is 3.

The generating of the trajectory for AV 1316 includes selecting travel segments associated with the number of predicted stops less than a threshold. In one embodiment, the AV 1316 specifies that the maximum number of stops across the generated trajectory must be less than a certain number, e.g., 11. In another embodiment, the AV 1316 specifies that the maximum number of stops on any single travel segment must not exceed a certain number, e.g., 2. The operational metric related to the number of predicted stops for the AV 1316 may therefore be minimized across the generated trajectory, or a sum of values of the operational metric may be minimized across the trajectory.

In FIG. 16, the number of stops on a single travel segment is minimized. Other travel segments (e.g., 1632) may exist that each have a number of predicted stops less than 3. The AV 1316 will select the other travel segments (e.g., 1632) to generate a trajectory between the initial spatiotemporal location 1620 and the destination spatiotemporal location 1624 instead of generating the candidate trajectory 1616.

Generation of an Optimal Trajectory to Reduce Collisions

Figure 17:
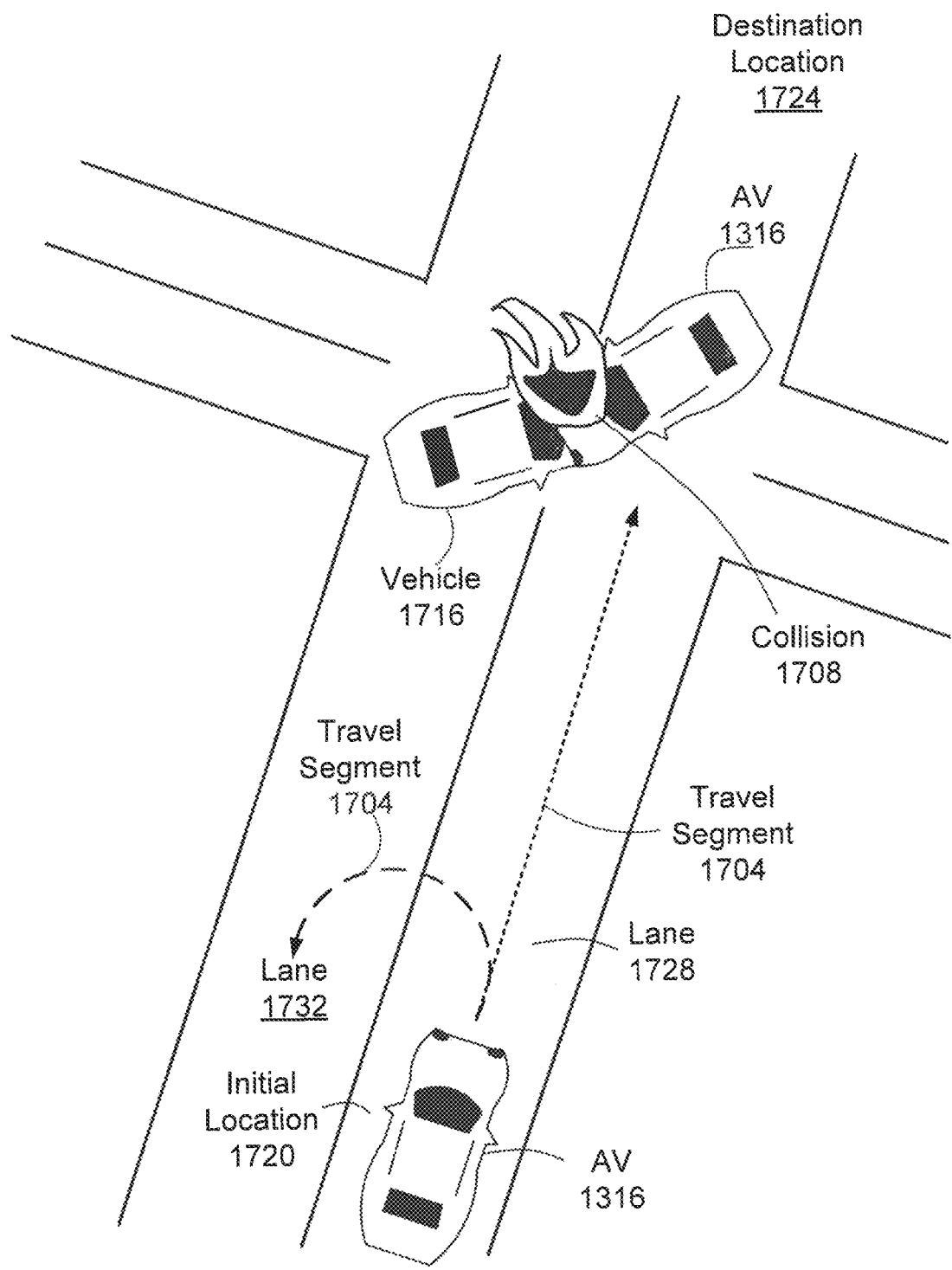
FIG. 17 illustrates an example of generating an optimal trajectory for an AV to reduce collisions with other objects, in accordance with one or more embodiments.

FIG. 17 illustrates an example of generating an optimal trajectory for the AV 1316 to reduce collisions with other objects (e.g., vehicle 1716), in accordance with one or more embodiments. An operational metric of the plurality of operational metrics associated with a travel segment (e.g., 1704) denotes a number of predicted collisions of the AV 1316 with objects (e.g., vehicle 1716 in FIG. 17) when traveling along the travel segment 1704. The generating of the trajectory includes selecting travel segments associated with the number of predicted collisions less than a threshold. The planning module 1324 generates a trajectory to avoid collisions. However, unlike operational metrics whose effects are summed to generate cumulative effects for trajectory generation, the effect of collisions is binary. In other words, if the planning module 1324 detects or knows of a collision on a candidate trajectory, then that candidate trajectory is discarded. It is irrelevant for the planning module 1324 to determine whether there is more than one collision on the candidate trajectory to evaluate the feasibility of the candidate trajectory. For example, the threshold would be set to 1 to avoid the AV 1316 colliding with any objects, e.g., other vehicles, pillars, buildings, pedestrians, cyclists, etc. The disclosed embodiments therefore generate an optimal trajectory for the AV 1316 based on optimizing for the number of collisions.

Turning now to FIG. 17, the AV 1316 is initially located at an initial spatiotemporal location 1720 in lane 1728. The AV 1316 receives an instruction (e.g., 1312) to travel to a destination spatiotemporal location 1724, also on lane 1728. A travel segment 1704 connects the initial spatiotemporal location 1720 to the destination spatiotemporal location 1724. There is another vehicle 1716 stopped on the travel segment 1704, with which the AV 1316 could collide, e.g., the AV 1316 has a non-zero likelihood of colliding with the vehicle 1716 if the AV 1316 navigates along the travel segment 1704.

The threshold for the operational metric denoting the number of predicted collisions of the AV 1316 with other objects (e.g., vehicle 1716) when traveling along a travel segment (e.g., 1704) is set to 1 to avoid collisions altogether. For example, in FIG. 17, the AV 1316 will not select travel segment 1704 when generating the trajectory. In embodiments, the threshold may be set to more than 1 at the time of generating the trajectory because the AV 1316's cameras and collision avoidance mechanisms can be used to avoid a collision when the AV 1316 eventually approaches the vehicle 1716 to steer away or stop. The threshold may be set to 1, for example, if no other trajectories are found.

Process for Generating an Optimal Trajectory for Navigation of an AV

Figure 18:
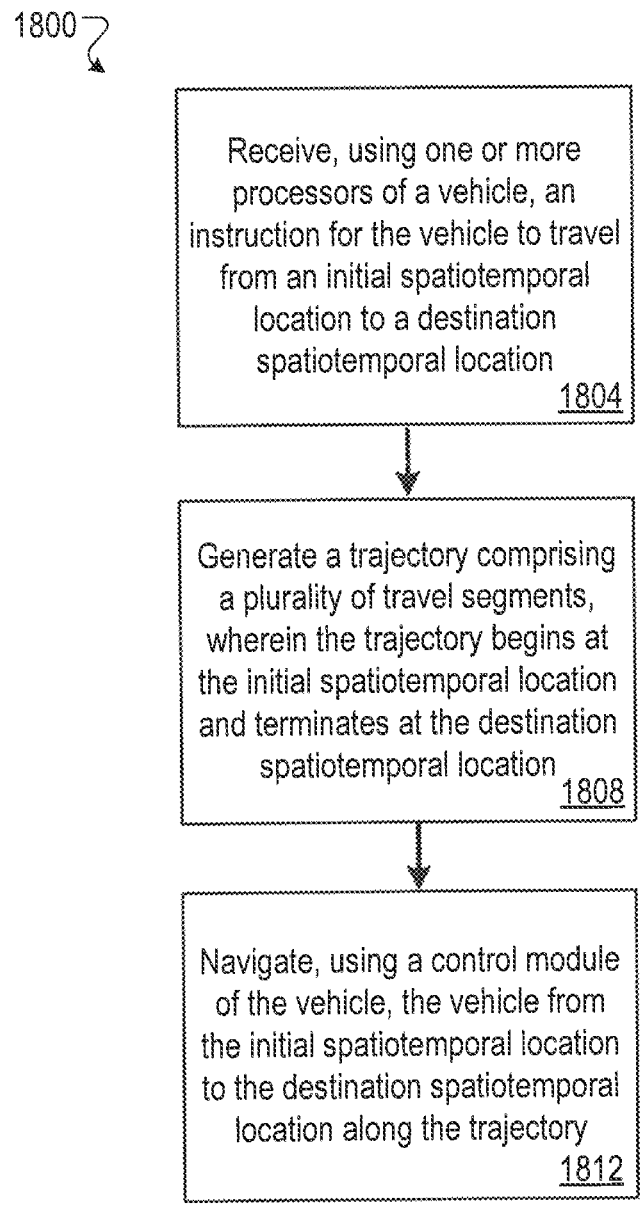
FIG. 18 illustrates a process for generating an optimal trajectory for navigation of an AV, in accordance with one or more embodiments.

FIG. 18 illustrates a process 1800 for generating an optimal trajectory for navigation of the AV 1316, in accordance with one or more embodiments. In one embodiment, the process of FIG. 18 is performed by one or more components (e.g., planning module 1324 in FIG. 13) of the AV 1316. Other entities (e.g., a remote server 1308 in FIG. 13) perform some or all of the steps of the process 1800 in other embodiments. Likewise, embodiments include different and/or additional steps, or perform the steps in different orders.

The AV 1316 receives 1804 an instruction (e.g., 1312 in FIG. 13) for the AV 1316 to travel from an initial spatiotemporal location (e.g., location 1404 in FIG. 14) to a destination spatiotemporal location (e.g., location 1408 in FIG. 14). The initial spatiotemporal location 1404 and the destination spatiotemporal location 1408 each include geographical coordinates, a travel time associated with the AV 1316 located at the geographical coordinates, or a heading (directional orientation or pose) of the AV 1316 located at the geographical coordinates. In one embodiment, the instruction 1312 includes GNSS coordinates, a name of a business, a street address, or a name of a city or town for the initial spatiotemporal location and the destination spatiotemporal location.

The AV 1316 generates 1808 a trajectory including a plurality of travel segments to navigate the AV 1316. The trajectory begins at the initial spatiotemporal location 1404 and terminates at the destination spatiotemporal location 1408. Each travel segment (e.g., 1436) of the plurality of travel segments begins at a first spatiotemporal location (e.g., location 1404) of a plurality of spatiotemporal locations and terminates at a second spatiotemporal location of the plurality of spatiotemporal locations. The plurality of spatiotemporal locations includes the initial spatiotemporal location 1404 and the destination spatiotemporal location 1408. Each travel segment (e.g., 1436) of the plurality of travel segments is associated with a plurality of operational metrics. The plurality of operational metrics is associated with navigating the AV 1316 along the travel segment. The trajectory is generated such that each operational metric of the plurality of operational metrics is optimized across the trajectory.

The AV 1316 is navigated 1812, using a control module (e.g., 1332 in FIG. 13), from the initial spatiotemporal location 1404 to the destination spatiotemporal location 1408 along the trajectory. The control module 1332 receives data representing the trajectory and the present AV position (e.g., location 1404), and operates the control functions (e.g., 420*a-c*-steering, throttling, braking, ignition in FIG. 4) of the AV 1316 in a manner that will cause the AV 1316 to travel along the trajectory to the destination spatiotemporal location 208. Therefore, each operational metric of the plurality of operational metrics is optimized across the plurality of travel segments within the road network to generate the trajectory.

Process for Generating an Optimal Trajectory for Navigation of an AV

FIG. 19 illustrates a process 1900 for generating an optimal trajectory for navigation of the AV 1316, in accordance with one or more embodiments. In one embodiment, the process of FIG. 19 is performed by one or more components (e.g., planning module 1324 in FIG. 13) of the AV 1316. Other entities (e.g., a remote server 1308 in FIG. 13) perform some or all of the steps of the process 1900 in other embodiments. Likewise, embodiments include different and/or additional steps, or perform the steps in different orders.

The AV 1316 generates 1904, using one or more processors, a plurality of travel segments (e.g., 1436, 1440, etc.) for navigating the AV 1316. The plurality of travel segments is associated with a plurality of operational metrics (e.g., m1, m2, etc.). Each travel segment (e.g., 1436) of the plurality of travel segments begins at a first spatiotemporal location (e.g., location 1404) of a plurality of spatiotemporal locations and terminates at a second spatiotemporal location of the plurality of spatiotemporal locations.

The AV 1316 ranks 1908, using the one or more processors, each operational metric of the plurality of operational metrics. The ranking is performed, such that a first operational metric (e.g., m1) of the plurality of operational metrics that is associated with navigational safety is ranked higher than a second operational metric (e.g., m2) of the plurality of operational metrics that is different from the first operational metric. For example, an operational metric (e.g., a predicted number of collisions of the AV 1316 with other vehicles) related to human safety is ranked higher, and the cost evaluation begins with this higher-ranked operational metric.

The AV 1316 selects 1912 one or more travel segments of the plurality of travel segments for navigating the AV 1316. Each operational metric of the plurality of operational metrics associated with the selected one or more travel segments is optimized in accordance with a rank of the operational metric. When two candidate travel segments or two candidate trajectories have the same value for a higher-ranked operational metric, the cost evaluation proceeds to the next lower-ranked operational metric, e.g., reducing driving time. In this manner, the cost evaluation iterates down the lower-ranked operational metrics until an optimal trajectory is generated. The ranking and priority of rules for navigation is explained in additional detail above with reference to FIG. 9.

The AV 1316 navigates 1916, using a control module 1332, the AV 1316 in accordance with the selected one or more travel segments. The control module 1332 receives the data representing the trajectory and the data representing the position of the AV 1316 and operates the control functions 420*a-c* (e.g., steering, throttling, braking, ignition) of the AV 1316 in a manner that will cause the AV 1316 to travel the trajectory to the destination.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
receiving, using one or more processors of a vehicle, an instruction for the vehicle to travel from an initial spatiotemporal location to a destination spatiotemporal location;
generating, using the one or more processors, a trajectory comprising travel segments, the trajectory beginning at the initial spatiotemporal location and terminating at the destination spatiotemporal location, wherein respective travel segments begin at a first spatiotemporal location of a plurality of spatiotemporal locations and terminate at a second spatiotemporal location of the plurality of spatiotemporal locations, and wherein respective travel segments are associated with a plurality of operational metrics,
wherein generating the trajectory comprises:
evaluating operational metrics corresponding to travel segments of the trajectory in an order of ranked priorities to determine costs of the travel segments, wherein the operational metrics are repeatedly summed in the order to a maximized operational metric in the order, and discarding travel segments that fail to satisfy an optimal value associated with the maximized operational metric for the travel segments of the trajectory to obtain a cost of the trajectory; and
navigating, using a control module of the vehicle, the vehicle from the initial spatiotemporal location to the destination spatiotemporal location in accordance with the trajectory.

2. The method of claim 1, wherein evaluating operational metrics corresponding to travel segments of the trajectory comprises maximizing or minimizing each operational metric across the trajectory.

3. The method of claim 1, wherein evaluating operational metrics corresponding to travel segments of the trajectory comprises maximizing or minimizing a sum of values of each operational metric across the trajectory.

4. The method of claim 1, wherein each spatiotemporal location of the plurality of spatiotemporal locations comprises at least one of geographical coordinates, a travel time associated with the vehicle, or a heading of the vehicle.

5. The method of claim 1, wherein an operational metric of the plurality of operational metrics that is associated with a travel segment denotes a number of predicted collisions of the vehicle with objects when traveling along the travel segment.

6. The method of claim 5, wherein generating the trajectory further comprises selecting travel segments associated with the number of predicted collisions less than a threshold.

7. The method of claim 6, wherein the threshold is 1.

8. The method of claim 1, wherein an operational metric of the plurality of operational metrics that is associated with a travel segment denotes a number of predicted stops for the vehicle when traveling along the travel segment.

9. The method of claim 8, wherein generating the trajectory further comprises selecting travel segments associated with the number of predicted stops less than a threshold.

10. The method of claim 1, wherein an operational metric of the plurality of operational metrics that is associated with a travel segment denotes a predicted lateral clearance between the vehicle and objects when traveling along the travel segment.

11. The method of claim 10, wherein generating the trajectory further comprises selecting travel segments associated with the predicted lateral clearance between the vehicle and the objects greater than a threshold.

12. The method of claim 1, wherein an operational metric of the plurality of operational metrics that is associated with a travel segment denotes a predicted acceleration or deceleration of the vehicle when traveling along the travel segment.

13. The method of claim 12, wherein generating the trajectory further comprises selecting travel segments associated with the predicted acceleration or deceleration less than a threshold.

14. The method of claim 1, wherein an operational metric of the plurality of operational metrics that is associated with a travel segment denotes an amount of road surface damage of the travel segment.

15. The method of claim 14, wherein generating the trajectory further comprises selecting travel segments associated with the amount of road surface damage less than a threshold to increase passenger comfort.

16. The method of claim 1, wherein generating the trajectory further comprises discarding travel segments associated with an operational metric having a value that is greater than an optimal value for the operational metric.

17. The method of claim 1, wherein generating the trajectory further comprises responsive to a value of an operational metric associated with a travel segment of a partial trajectory falling below a threshold, terminating, using the one or more processors, evaluation of the partial trajectory.

18. A vehicle comprising:
one or more computer processors; and
one or more non-transitory storage media storing instructions which, when executed by the one or more computer processors, cause the one or more computer processors to:
receive an instruction for the vehicle to travel from an initial spatiotemporal location to a destination spatiotemporal location;
generating, using the one or more processors, a trajectory comprising of travel segments, the trajectory beginning at the initial spatiotemporal location and terminating at the destination spatiotemporal location, wherein respective travel segments begin at a first spatiotemporal location of a plurality of spatiotemporal locations and terminate at a second spatiotemporal location of the plurality of spatiotemporal locations, and wherein respective travel segments are associated with a plurality of operational metrics,
wherein generating the trajectory comprises:
evaluating operational metrics corresponding to travel segments of the trajectory in an order of ranked priorities to determine costs of the travel segments, wherein the operational metrics are repeatedly summed in the order to a maximized operational metric in the order, and discarding travel segments that fail to satisfy an optimal value associated with the maximized operational metric for the travel segments of the trajectory to obtain a cost of the trajectory; and
navigating, using a control module of the vehicle, the vehicle from the initial spatiotemporal location to the destination spatiotemporal location in accordance with the trajectory.

19. One or more non-transitory storage media storing instructions which, when executed by one or more computing devices, cause the one or more computing devices to:
receive an instruction for a vehicle to travel from an initial spatiotemporal location to a destination spatiotemporal location;
generate, using the one or more computing devices, a trajectory comprising travel segments, the trajectory beginning at the initial spatiotemporal location and terminating at the destination spatiotemporal location, wherein respective travel segments begin at a first spatiotemporal location of a plurality of spatiotemporal locations and terminate at a second spatiotemporal location of the plurality of spatiotemporal locations, and wherein respective travel segments are associated with a plurality of operational metrics,
wherein generating the trajectory comprises:
evaluating operational metrics corresponding to travel segments of the trajectory in an order of ranked priorities to determine costs of the travel segments, wherein the operational metrics are repeatedly summed in the order to a maximized operational metric in the order, and discarding travel segments that fail to satisfy an optimal value associated with the maximized operational metric for the travel segments of the trajectory to obtain a cost of the trajectory; and
navigating, using a control module of the vehicle, the vehicle from the initial spatiotemporal location to the destination spatiotemporal location in accordance with the trajectory.

20. The one or more non-transitory storage media of claim 19, wherein each operational metric of the plurality of operational metrics is maximized or minimized across the trajectory.

* * * * *

UNITED STATES PATENT AND TRADEMARK OFFICE
CERTIFICATE OF CORRECTION

PATENT NO. : 11,796,332 B2
APPLICATION NO. : 16/655411
DATED : October 24, 2023
INVENTOR(S) : Kostyantyn Slutskyy and Dmytro S. Yershov Page 1 of 1

It is certified that error appears in the above-identified patent and that said Letters Patent is hereby corrected as shown below:

In the Claims

Column 31, Line 29, In Claim 18, after "comprising" delete "of".

Signed and Sealed this
Ninth Day of July, 2024

Katherine Kelly Vidal
*Director of the United States Patent and Trademark Office*